(12) United States Patent
Ninose et al.

(10) Patent No.: US 7,373,470 B2
(45) Date of Patent: May 13, 2008

(54) REMOTE COPY CONTROL IN A STORAGE SYSTEM

(75) Inventors: Kenta Ninose, Yokohama (JP); Hiroshi Arakawa, Sagamihara (JP); Yasutomo Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 238 days.

(21) Appl. No.: 11/285,195

(22) Filed: Nov. 23, 2005

(65) Prior Publication Data
US 2007/0073986 A1  Mar. 29, 2007

(30) Foreign Application Priority Data
Sep. 29, 2005  (JP) .............................. 2005-283276

(51) Int. Cl.
*G06F 12/16* (2006.01)
(52) U.S. Cl. ..................... 711/162; 711/114; 711/165
(58) Field of Classification Search ................ 711/114, 711/161, 162, 165; 707/204
See application file for complete search history.

(56) References Cited

U.S. PATENT DOCUMENTS

| | | | |
|---|---|---|---|
| 7,167,963 B2 * | 1/2007 | Hirakawa et al. ............ | 711/162 |
| 2004/0250030 A1 * | 12/2004 | Ji et al. ....................... | 711/162 |
| 2005/0038968 A1 * | 2/2005 | Iwamura et al. ............. | 711/162 |
| 2005/0138308 A1 | 6/2005 | Morishita et al. | |
| 2006/0288178 A1 * | 12/2006 | Yagawa et al. .............. | 711/162 |
| 2007/0005917 A1 * | 1/2007 | Morishita et al. ........... | 711/162 |
| 2007/0067584 A1 * | 3/2007 | Muto .......................... | 711/162 |

FOREIGN PATENT DOCUMENTS

| | | |
|---|---|---|
| JP | 2005-78453 | 3/2005 |
| JP | 2005-182222 | 7/2005 |

OTHER PUBLICATIONS

"Using Asynchronous Replication for Business Continuity Between Two or More Sites", A Technical Whitepaper on SRDF/A, Including Usage with SRDF/Star.

* cited by examiner

*Primary Examiner*—Jack Lane
(74) *Attorney, Agent, or Firm*—Antonelli, Terry, Stout & Kraus, LLP.

(57) ABSTRACT

In a storage system that executes multi-target remote copying, the identity of data across two secondary storage subsystems may be quickly and flexibly ensured. The storage system includes a first storage subsystem that has a first storage area and multiple second storage subsystems that each have a second storage area to store duplicate data for data stored in the first storage area. In this storage system, a write process that writes write data to the first storage area is executed. In response to the write process, the write data is copied to the second storage area of each second storage subsystem. Furthermore, a write section that the copy information belongs to, wherein the copy information that corresponds to the write process, is determined for each write process. In addition, history information regarding each executed copy operation is created for each write section to which the copy information used for such operation belongs.

18 Claims, 19 Drawing Sheets

| NUMBER | PRIMARY VOLUME | | SECONDARY VOLUME | | COPY TYPE |
|---|---|---|---|---|---|
| | STORAGE SUBSYSTEM IDENTIFIER | VOLUME IDENTIFIER | STORAGE SUBSYSTEM IDENTIFIER | VOLUME IDENTIFIER | |
| 1 | #100 | 0000 | #110 | FFA0 | SYNCHRONOUS |
| 2 | #100 | 0000 | #120 | 0001 | ASYNCHRONOUS |

| PAIR NUMBER | PRIMARY VOLUME | | SECONDARY VOLUME | | COPY TYPE |
|---|---|---|---|---|---|
| | STORAGE SUBSYSTEM IDENTIFIER | VOLUME IDENTIFIER | STORAGE SUBSYSTEM IDENTIFIER | VOLUME IDENTIFIER | |
| 1 | #100 | 0000 | #110 | FFA0 | SYNCHRONOUS |

| PAIR NUMBER | PRIMARY VOLUME | | SECONDARY VOLUME | | COPY TYPE |
|---|---|---|---|---|---|
| | STORAGE SUBSYSTEM IDENTIFIER | VOLUME IDENTIFIER | STORAGE SUBSYSTEM IDENTIFIER | VOLUME IDENTIFIER | |
| 1 | #100 | 0000 | #120 | 0001 | ASYNCHRONOUS |

Fig.7
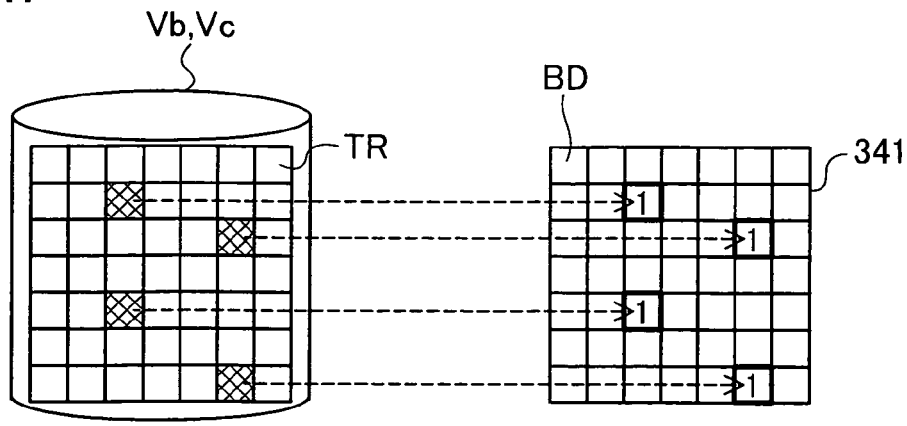
Fig.8
| BITMAP NUMBER | 1 | 2 | 3 |
|---|---|---|---|
| TARGET WRITE SECTION | #5 | #3 | #4 |
| BM MARKER INFORMATION | NOT RECEIVED | 30 | 40 |
| STATUS | NOT RECEIVED | FIXED | FIXED |
320
Fig.9
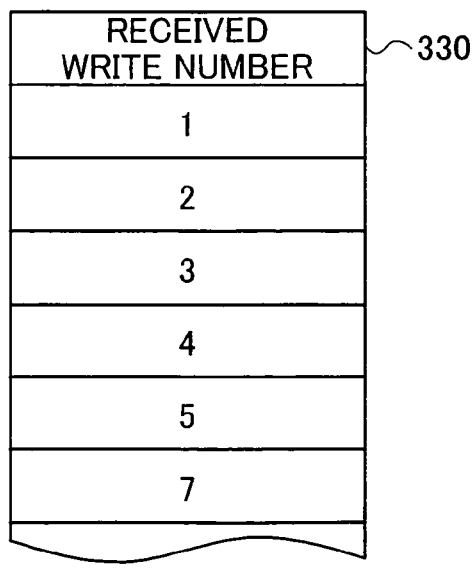

Fig.20

|   | FIXED UPDATE BM MARKER FOR VOLUME Vb | FIXED UPDATE BM MARKER FOR VOLUME Vc | CREATION POSSIBLE | UPDATE BMs USED FOR CREATION |
|---|---|---|---|---|
| 1 | SECTION NUMBERS 4, 5 | SECTION NUMBERS 3, 4 | ○ | UPDATE BMs FOR WRITE SECTIONS HAVING WRITE SECTION NUMBER INCLUDING AND AFTER 5 |
| 2 | SECTION NUMBERS 4, 5 | SECTION NUMBERS 2, 3 | ○ | UPDATE BMs FOR WRITE SECTIONS HAVING WRITE SECTION NUMBER INCLUDING AND AFTER 4 |
| 3 | SECTION NUMBERS 4, 5 | SECTION NUMBERS 1, 2 | × | — |

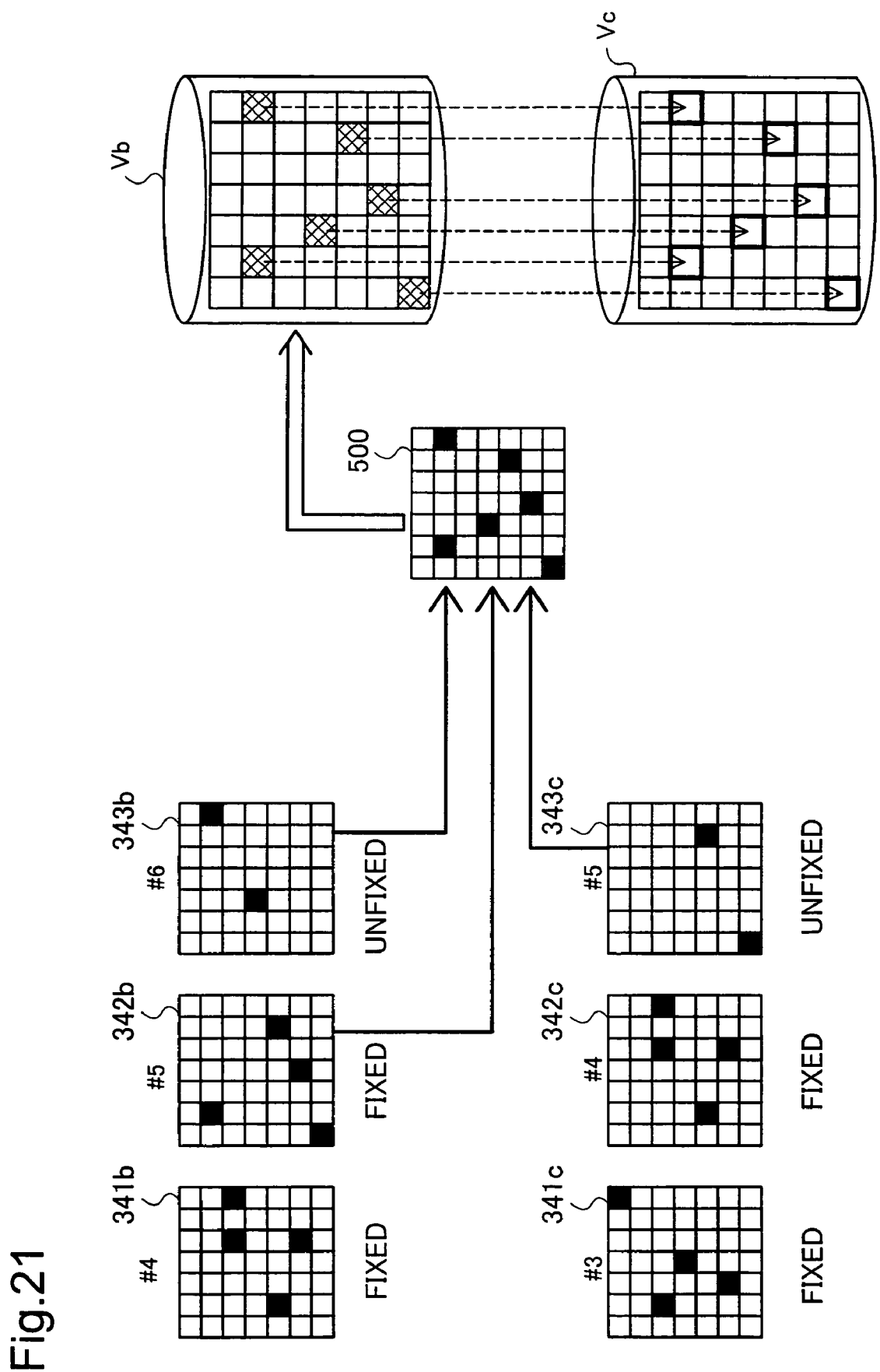

REMOTE COPY CONTROL IN A STORAGE SYSTEM

CROSS REFERENCE TO RELATED APPLICATIONS

This application relates to and claims priority from Japanese Patent Application No. 2005-283276, filed on Sep. 29, 2005, the entire disclosure of which is incorporated by reference.

BACKGROUND

The present invention relates to the control of a storage system, and more particularly to the control of a remote copy process in a storage system that includes multiple storage subsystems.

In a storage system, remote copying is generally used in order to increase the reliability of data. Remote copying involves setting up a primary storage subsystem and a secondary storage subsystem within the storage system, and copying data written to the storage area of the primary storage subsystem to the storage area of the secondary storage subsystem.

Furthermore, in order to increase the reliability of data in the storage system, data stored in one primary storage subsystem is remotely copied to two or more secondary storage subsystems (this is also referred to as 'multi-target remote copying' below). In this type of storage system, it is necessary to ensure that the duplicate data stored in the two secondary storage subsystems is identical in the event some sort of error or problem occurs in the primary storage system, for example.

For example, a technology is known in which, in a storage system that includes a primary storage subsystem, a secondary storage subsystem in which duplicate data is written synchronously with the writing of data to the primary storage subsystem, and a different secondary storage subsystem to which duplicate data is written asynchronously with the writing of data to the primary storage subsystem, the sameness of the data residing in the two secondary storage subsystems is ensured simply by copying difference data regarding the differences between the two sets of data residing therein.

According to the conventional art described above, in the event of a failure in the primary storage subsystem, a copy pair can be quickly formed using the two secondary storage subsystems.

SUMMARY

However, the above technology of the conventional art may not be able to flexibly accommodate the system construction of the storage system or the type of remote copying used. For example, the prior art technology entails the problem that one secondary storage subsystem may only ensure data identity via difference data copying when such copying is performed to another secondary storage subsystem determined in advance. Therefore, such technology may quickly form copy pairs only for limited combinations thereof.

The aspects described hereinbelow are directed to addressing the aforementioned problem, and have as an object to speedily and flexibly preserve the identity of data between two secondary storage subsystems belonging to a storage system that performs remote copying between two or more secondary storage subsystems.

A first aspect provides a storage system that includes a first storage subsystem having a first storage area and multiple second storage subsystems that each include a second storage area for storing duplicate data that duplicates data stored in the first storage area. The first storage subsystem of the storage system pertaining to this first aspect includes a writing module, a copy information transmission module, a section establishment module and a section information transmission module. The writing module executes a write process by which write data is written to the first storage area. The copy information transmission module, in conjunction with the write process, sends copy information to the second storage subsystems, wherein the copy information is used to copy the write data to the second storage areas. The section establishment module establishes a write section for each write process, wherein the write section is a temporal section to which the copy information corresponding to the write process belongs. The section information transmission module transmits section information to the second storage subsystems, wherein the section information indicates the write section to which the copy information belongs.

The second storage subsystems of the storage system pertaining to this first aspect each include a copy execution module and a history creation module. The copy execution module executes a copy process corresponding to the write process using the copy information. The history creation module creates history information using the section information for each write section that the copy information used in the copy process belongs to, wherein the history information includes history of each executed copy process.

According to the storage system pertaining to this first aspect, the first storage subsystem establishes a write section to which the copy information belongs and multiple secondary storage subsystems each create history information of copy process for each write section to which the copy information used in the copy process belongs. Therefore, when the above history information is used, the differences in data residing in any two storage areas among the second storage areas of the multiple second storage subsystems may be sought. As a result, the identity of the two storage areas may be speedily ensured simply via copying of the difference data.

In the storage system according to a second aspect, at least one of the multiple second storage subsystems further includes a difference information creation module and a synchronization module. The difference information creation module creates difference information that indicates differences between first data and second data, using at least part of the history information possessed by one of the second storage subsystems and the history information possessed by another of the second storage subsystem. The first data stores in the second storage area belonging to the one of the second storage subsystem. The second data stores in the second storage area belonging to the another of the second storage subsystem. The synchronization module harmonizes the first data and the second data, using the difference information.

According to the storage system pertaining to this second aspect, the data stored in the second storage area of one second storage subsystem may be quickly harmonized with the data stored in the second storage area of a different second storage subsystem using difference data.

The invention may be reduced to practice in various aspects as well. For example, it could be reduced to practice such as a computer system that includes a storage system pertaining to either of the aspects described above and a host computer, or a control method for a storage system. Furthermore, it could be reduced to practice such as a computer program to realize the above method, such as a program for each storage subsystem in the storage system, as well as a storage medium on which this computer program is recorded, data signals encoded in a carrier wave that includes this computer program, for example.

The above and other objects, features, aspects, and advantages of the present invention will become more apparent from the following detailed description and the accompanying drawings.

BRIEF DESCRIPTION OF THE DRAWINGS

FIG. 3 is a block diagram showing the internal arrangement of the memory 114a of a primary storage subsystem 100a;

FIGS. 5A-5C are schematic diagrams showing the contents of pair information;

FIG. 7 is a schematic diagram showing the contents of an update bitmap;

FIG. 8 is a schematic diagram showing the contents of bitmap management information;

FIG. 9 is a schematic diagram showing the contents of a copy information management table;

FIG. 20 is a table to explain the possibility of creating difference information;

FIG. 21 is an illustration summarizing the pair formation process;

DESCRIPTION OF THE PREFERRED EMBODIMENTS

The embodiment of the invention is described with reference to the accompanying drawings.

A. Embodiment

A-1. Construction of Computer System

Figure 1:
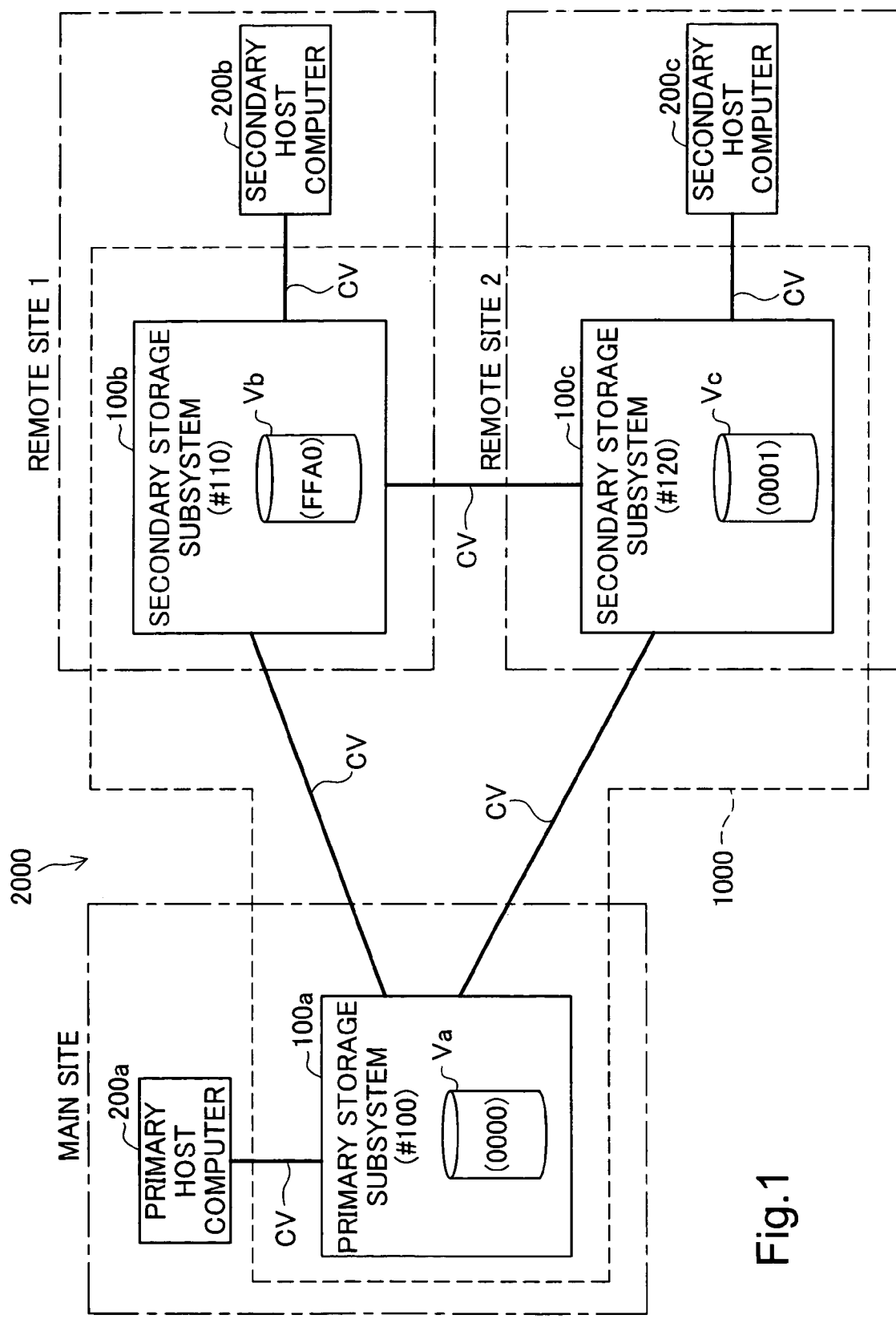
FIG. 1 is an illustration showing an example of the arrangement of a computer system including a storage system pertaining to this embodiment.
Figure 2:
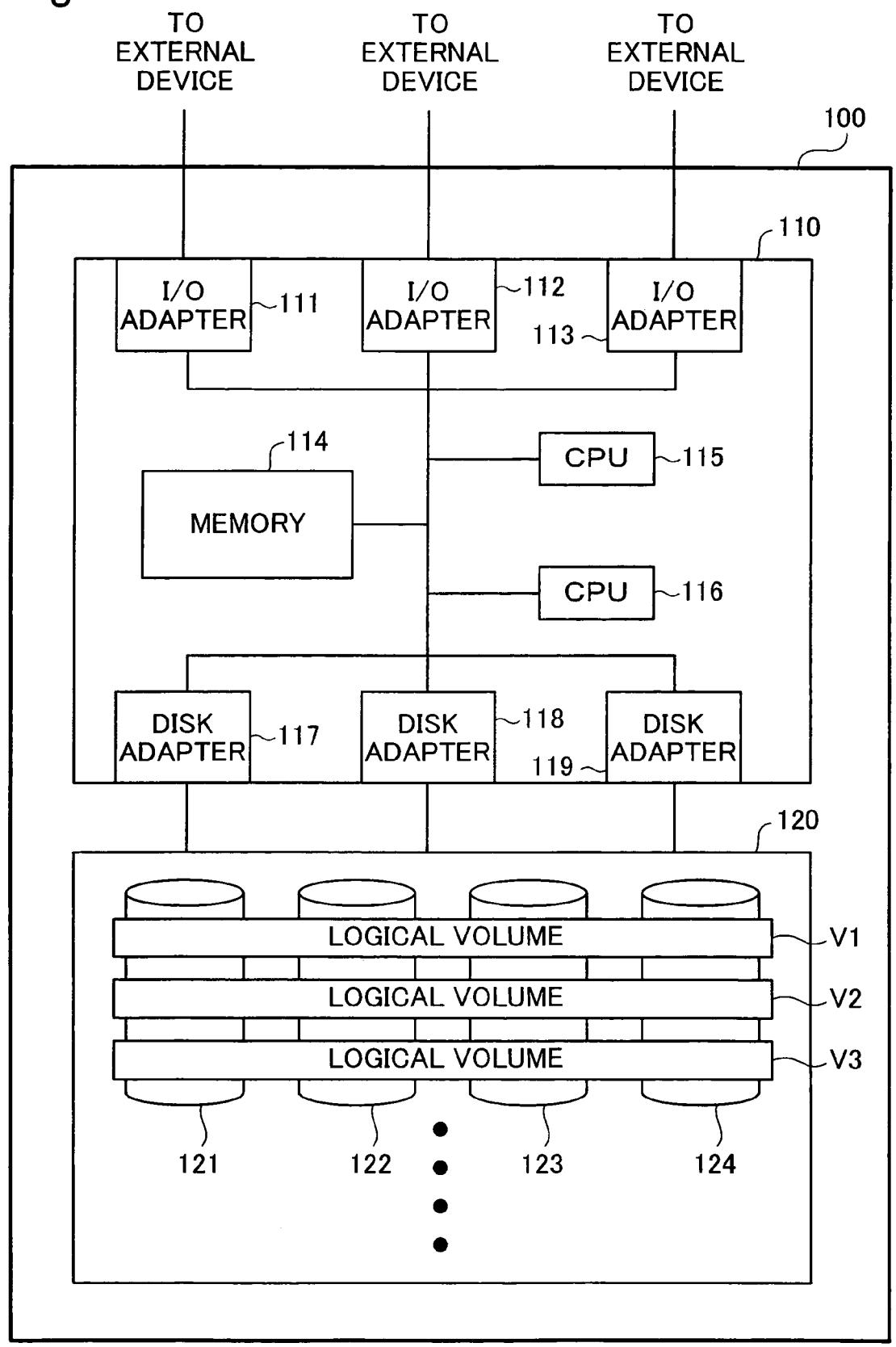
FIG. 2 is an illustration showing a simplified arrangement of a storage system.

The basic construction of a storage system pertaining to an embodiment will be described with reference to FIGS. 1 and 2. FIG. 1 is an illustration showing an example of the arrangement of a computer system pertaining to the storage system pertaining to this embodiment. FIG. 2 is an illustration showing the construction of a storage subsystem.

The computer system 2000 shown in FIG. 1 includes a storage system 1000. The storage system 1000 includes a primary storage subsystem 100a and two secondary storage subsystems 100b, 100c. The primary storage subsystem 100a is communicably connected to the secondary storage subsystems 100b, 100c via communication lines CV. In addition, the two secondary storage subsystems 100b, 100c may connect to each other via a communication line CV. The two secondary storage subsystems 100b, 100c may or may not be interconnected during normal operation described below, but must be communicably interconnected during a failure as described below. Each of the storage subsystems 100a-100c is installed at a different physical site. In the discussion below, the site at which the primary storage subsystem 100a is located is deemed the main site, and the sites at which the secondary storage subsystems 100b, 100c are located are deemed remote sites 1 and 2, respectively.

The primary storage subsystem 100a is connected at the main site to a primary host computer 200a via a communication line CV. The two secondary storage subsystems 100b, 100c are respectively connected to secondary host computers 200b, 200c at the respective remote sites over a communication line CV. The communication lines CV may be a network that carries out data transmission using the fiber channel protocol (FC-SAN) or an IP network that carries out data transmission using the iSCSI protocol (IP-SAN).

Next, the hardware constructions of the respective storage subsystems 100a-100c will be described. Each of the storage subsystems 100a-100c has a basically identical construction. In the description below, where there is no need to distinguish between the various storage subsystems 100a-100c, the letter at the end of the identifying number 100 will be omitted.

The storage subsystem 100 includes a controller 110 and a storage unit 120, as shown in FIG. 2. The controller 110 controls the entire storage subsystem 100. For example, the controller 110 principally receives data from external devices, writes the data to the storage unit 120, reads data from the storage unit 120 and transmits the read data to external devices. The controller 110 includes I/O adapters 111-113, a memory 114, central processing units (CPUs) 115, 116 and disk adapters 117-119. The number of these constituent elements is not limited to the number shown in FIG. 2, and multiple memories 114 may be incorporated, for example, or an even larger number of CPUs may be used. In addition, in order to increase the reliability of the storage subsystem 100, multiple memories may be used for the memory 114.

The I/O adapters 111-113 are interfaces used to input and output data and commands to and from external devices. The memory 114 stores control programs and the like that implement the functions of the controller 110, as described below. The CPUs 115, 116 are processors that implement the functions of the controller 110 by executing the control programs described above. The disk adapters 117-119 are interfaces that implement data I/O to and from the storage unit 120.

The storage unit 120 is composed of numerous disk devices. In FIG. 2, four disk devices 121-124 among these numerous disk devices are shown. These disk devices provide physical storage areas in which data is actually stored. These disk devices realize the reading and writing of data to and from these physical storage areas under the control of the controller 110. The controller 110 manages these physical storage areas in association with logical volumes that is logical storage areas. In the example shown in FIG. 2, the physical areas of the disk devices 121-124 are associated with the multiple logical volumes V1-V3. The associations between the logical volumes and the physical storage areas are carried out based on the so-called RAID (Redundant Array of Inexpensive Disks) method (multiple methods such as RAID 0, RAID 5 exist).

Logical volumes are provided as storage areas to external devices (such as the primary host computer 200a described above, for example) that access the storage subsystem 100. Each logical volume is treated as an independent storage area and is identified via a unique logical volume identifier.

In FIG. 1, among these logical volumes, the logical volume Va for the primary storage subsystem 100a, the logical volume Vb for the secondary storage subsystem 100b and the logical volume Vc for the secondary storage subsystem 100c are shown. The identifiers for the logical volumes Va, Vb, Vc are '0000', 'FFA0' and '0001', respectively. The logical volume Va is a storage area provided to the primary host computer 200a. The logical volumes Vb and Vc are storage areas that store duplicate data stored in the logical volume Va. The combination of a primary volume and a secondary volume that stores duplicate data that duplicates the data stored in the primary volume is termed a copy pair. In addition, a copy pair including a primary volume and a secondary volume residing in a different storage subsystem 100 is termed a remote copy pair. In other words, the logical volume Va and logical volume Vb form a remote copy pair in which the logical volume Va is deemed the primary volume and the logical volume Vb is deemed the secondary volume. Similarly, the logical volume Va and logical volume Vc form a copy pair in which the logical volume Va is deemed the primary volume and the logical volume Vc is deemed the secondary volume. In the discussion below, the former copy pair is deemed a first remote copy pair and the latter copy pair is deemed a second remote copy pair.

The internal arrangement of the memories of the storage subsystems 100a-100c will now be described with reference to FIGS. 3-9. Here, where it is necessary to distinguish among the constituent components of the respective storage subsystems 100a-100c, the appropriate letter will be appended to the end of the number indicating the corresponding component as described with reference to FIG. 2. For example, the memory of the primary storage subsystem 100a is expressed as the memory 114a, and the memory of the secondary storage subsystem 100b is expressed as the memory 114b.

Figure 3:
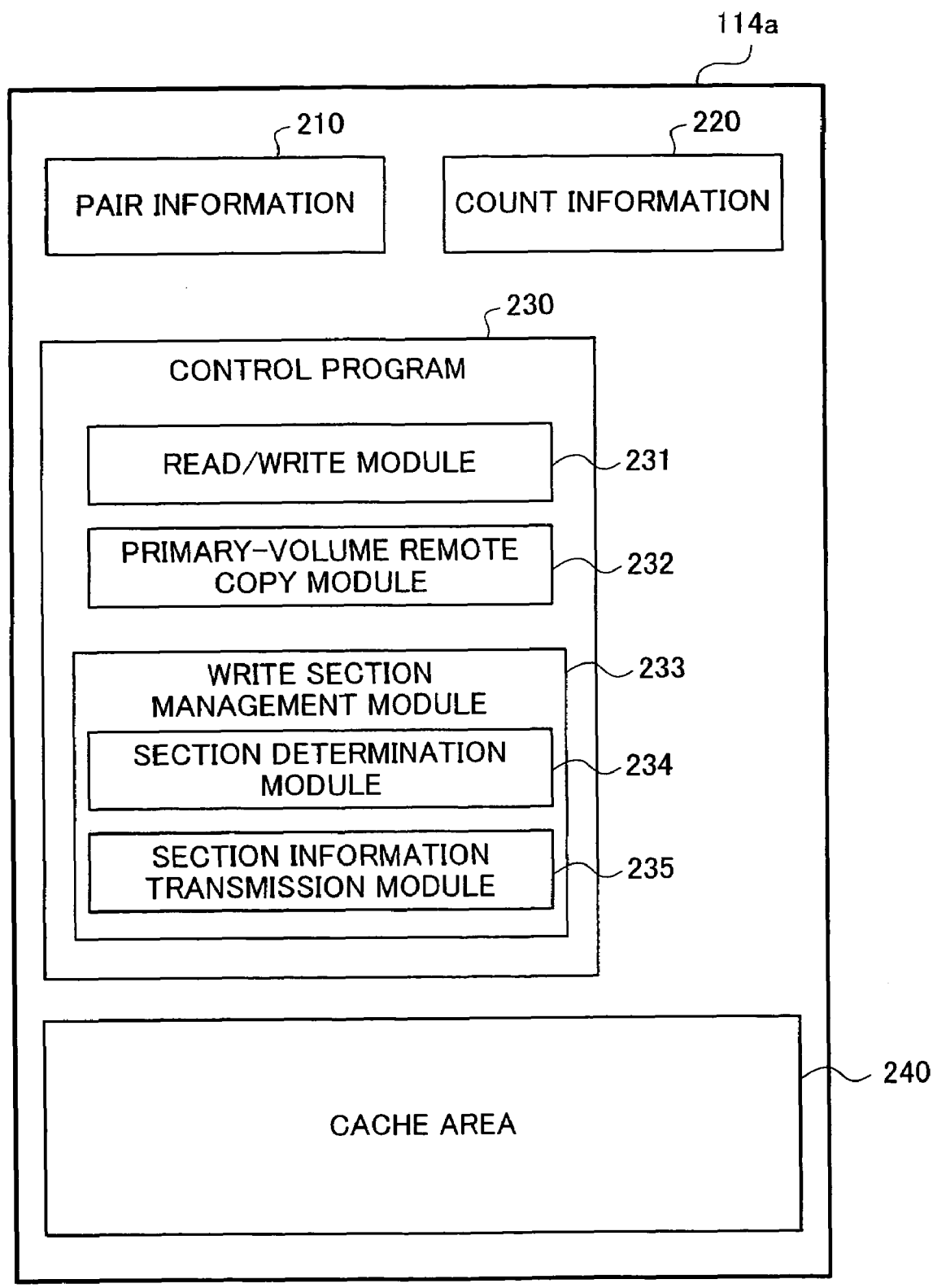
Figure 4:
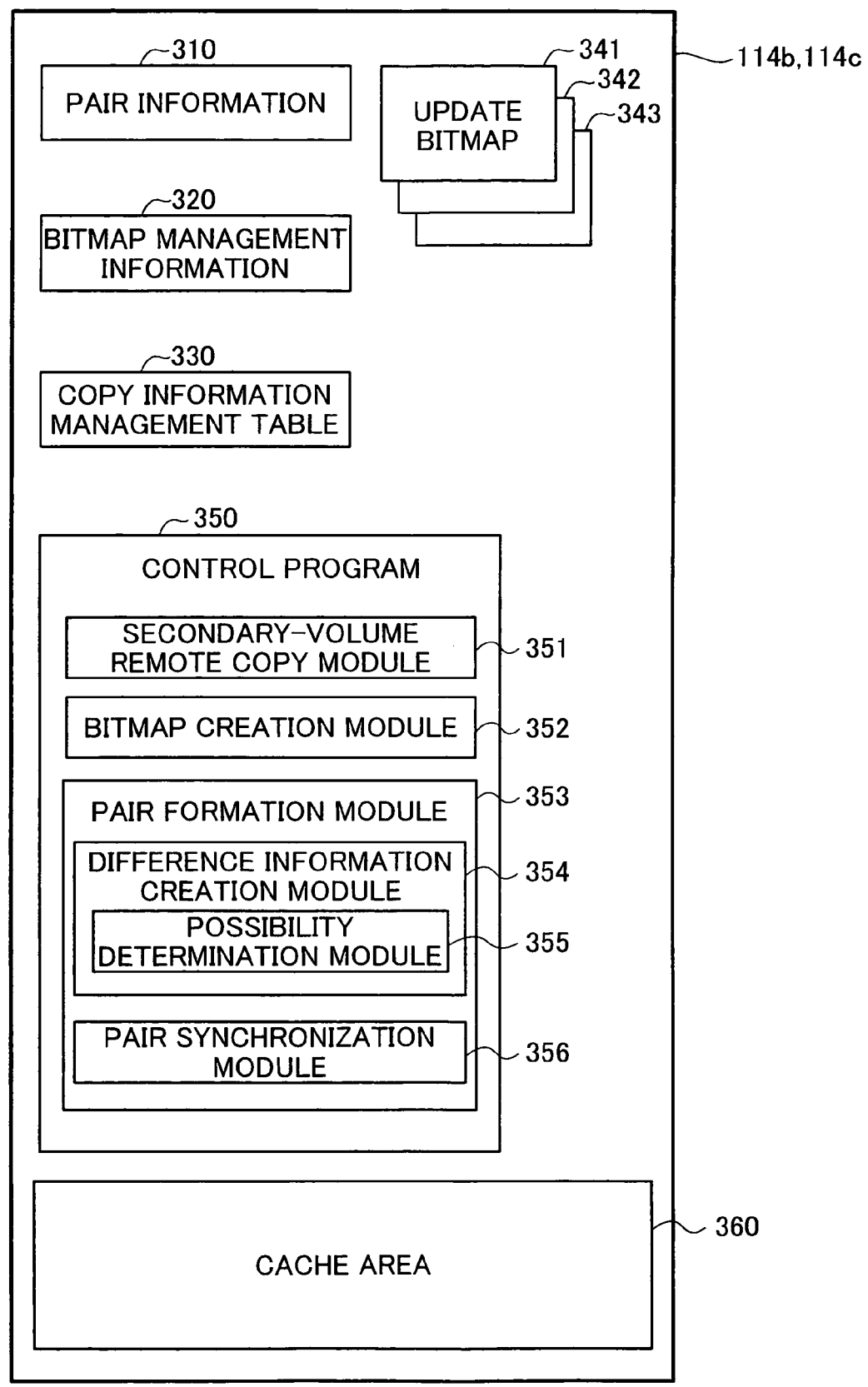
FIG. 4 is a block diagram showing the internal arrangement of the memories of secondary storage subsystems.
Figure 6:
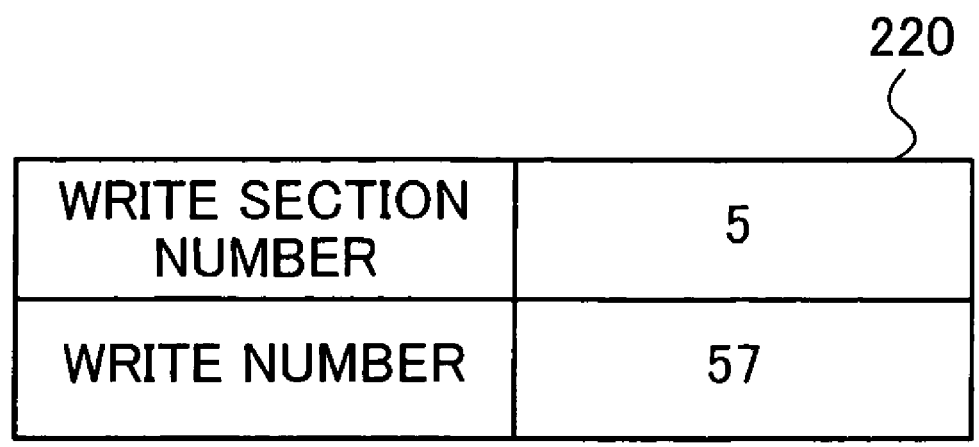
FIG. 6 is a schematic diagram showing the contents of count information.

FIG. 3 is a block diagram showing the internal arrangement of the memory 114a of the primary storage subsystem 100a. FIG. 4 is a block diagram showing the internal arrangement of the memories 114b, 114c of the secondary storage subsystems 100b, 100c. FIGS. 5A-5C are schematic diagrams showing the contents of pair information. FIG. 6 is a schematic diagram showing the contents of count information. FIG. 7 is a schematic diagram showing the contents of an update bitmap. FIG. 8 is a schematic diagram showing the contents of bitmap management information. FIG. 9 is a schematic diagram showing the contents of a copy information management table.

Pair information 210, count information 220 and a control program 230 are stored in the memory 114a of the primary storage subsystem 100a. In addition, a cache area 240 that temporarily stores various types of data (such as data received from external devices and data read from the storage unit 120) is maintained in the memory 114a.

Pair information 210 is information that defines the copy pairs described above. The pair information 210 includes information that specifies the primary and secondary volume that form the copy pair. The primary volume and secondary volume are specified using the identifier of the storage subsystem 100 in which the volumes reside and the volume identifiers in that storage subsystem 100. For example, the pair information 210 stored in the primary storage subsystem 100a consists of pair information for a copy pair regarding which at least one of either the primary volume or the secondary volume exists in the primary storage subsystem 100a. In the example shown in FIG. 5A, line 1 of the pair information 210 defines the first remote copy pair described above. The identifier '#100' of the primary storage subsystem 100a and the identifier '0000' of the logical volume Va are recorded in line 1 of the pair information 210 in order to specify the logical volume Va (FIG. 1) as the primary volume. In addition, the identifier '#110' of the secondary storage subsystem 100b (FIG. 1) and the identifier 'FFA0' of the logical volume Vb are specified in line 1 of the pair information 210 in order to specify the logical volume Vb as the secondary volume. Similarly, the second remote copy pair described above is defined in line 2 of the pair information 210.

The pair information 210 further includes the copy type for each copy pair. Copy type information is information indicating whether the type of copying is synchronous or asynchronous copying, for example. To describe it in simple terms, during synchronous remote copying, when a request to write data to the primary volume is received from an external device, copy information is sent to the storage subsystem 100 to which the secondary volume belongs, and after a response indicating that the copy information has been completely received has been received from the storage subsystem 100, the external device is notified that processing for the write request has been completed. During asynchronous remote copying, on the other hand, when a request to write data to the primary volume is received from an external device, the external device is notified of the completion of write request processing before the copy information is sent. In asynchronous remote copying, the transmission of the copy information to the storage subsystem 100 to which the secondary volume belongs is performed in the background.

The count information 220 includes count values for the write number and the write section number, as shown in FIG. 6. The write number is recorded for each primary volume of a remote copy pair. Here, the write number is obtained for each primary volume of a remote copy pair, not for each remote copy pair. If the logical volume Va is the only primary volume for any remote pair, as shown in FIG. 1, one write number is recorded. In other words, where there are multiple remote copy pairs that share a common primary volume (such as the first and second remote copy pairs in FIG. 1, for example), a common write number is used. On the other hand, one value is recorded for the write section number. The write number and the write section number will be described below.

The control program 230 includes various modules to implement the functions of the controller 110a of the primary storage subsystem 100a, but only the modules necessary for the description of this embodiment are shown in FIG. 3. The control program 230 includes a read/write module 231, a primary-volume remote copy module 232 and a write section management module 233. The read/write module 231 receives read requests and write requests transmitted from external devices (such as the primary host computer 200a). The read/write module 231 also executes write processing to write to the logical volume in the primary storage subsystem 100a write data corresponding to a write request. Furthermore, the read/write module executes read processing to read out from the logical volume in the primary storage subsystem 100a data corresponding to a read request and transmit this data to an external device. The primary-volume remote copy module 232 transmits to the remote copy destination, i.e., to the storage subsystem 100 to which the secondary volume of the remote copy pair belongs (for example, to the secondary storage subsystem 100b), the copy information corresponding to the write process for the primary volume of the copy pair residing in the primary storage subsystem 100a. Copy information is information used to copy the write data for the corresponding write process to the secondary volume. The write section management module 233 executes processing related to write sections. A write section is a temporal section to which the copy information corresponding to the above write process belongs. The write section management module 233 includes as submodules a section determination module 234 and a section information transmission module 235. The section determination module 234 determines for each write process a write section to which the copy information corresponding to the write process belongs. Because a write section is determined for each write process, copy information corresponding to the identical write process (for example, copy information respectively sent to multiple different secondary volumes) belong to the same write section. Each write section is identified by a write section number. The section information transmission module 235 transmits notification of the section information to the storage subsystem 100 that is the remote copy destination. The section information is information used to specify, in the storage subsystem 100 that is the remote copy destination, the write section to which the above copy information belongs. In this embodiment, data termed a 'BM marker' and the write section number included in each copy information packet are used as the section information, and this concept will be described in more detail below.

Pair information 310, bitmap management information 320, a copy information management table 330, update bitmaps 341-343 and a control program 350 are stored in each of the memories 114b, 114c of the respective secondary subsystems 100b, 100c. Furthermore, a cache area 360 that temporarily stores various types of data (such as data received from an external device and data read out from the storage unit 120) is maintained in the memories 114b, 114c in the same manner as for the memory 114a described above. In the description below, where it is necessary to distinguish components stored in the memory 114b of the secondary storage subsystem 100b from those stored in the memory 114c of the secondary storage subsystem 100c, such distinction will be indicated using the letter 'b' or 'c' at the end of the identifying number. For example, the update bitmaps for the secondary storage subsystem 100b are indicated as '341b-343b', while the bitmaps for the secondary storage subsystem 100c are indicated as '341c-343c'.

The pair information 310, like the above pair information 210, is information that defines a copy pair. For example, the pair information 310b stored in the secondary storage subsystem 100b is pair information regarding a copy pair regarding which at least one of either the primary volume or the secondary volume exists in the secondary storage subsystem 100b. In the example shown in FIG. 5B, line 1 of the pair information 310b defines the first remote copy pair described above in which the logical volume Vb of the secondary storage subsystem 100b is deemed the secondary volume. Similarly, the pair information 310c stored in the secondary storage subsystem 100c is pair information for a copy pair regarding which at least one of either the primary volume or the secondary volume exists in the secondary storage subsystem 100c. In the example shown in FIG. 5C, line 1 of the pair information 310c defines the second remote copy pair described above in which the logical volume Vc of the secondary storage subsystem 100c is deemed the secondary volume.

The update bitmaps 341-343 are maps to record the history of data updates effected via remote copying in the secondary volume of a remote pair. The update bitmaps 341-343 are prepared for each secondary volume. Specifically, the update bitmaps 341-343 divide a secondary volume into multiple sub-storage areas and the existence or non-existence of data change via remote copying is recorded in each sub-storage area. In this embodiment, each logical volume is managed using logical sub-storage areas termed 'tracks'. FIG. 7 shows in a conceptual fashion a logical volume Vb, Vc and the multiple tracks TR contained therein. Each of the multiple blocks shown in the logical volume Vb, Vc represents a single track TR. The shaded tracks TR at the left side of FIG. 7 represent tracks in which the data has been changed via remote copying. In this embodiment, the update bitmaps 341-343 are collections of one-bit data BD for each track TR belonging to a secondary volume that is a target of data recording, as shown at the right side of FIG. 7. An individual track TR and each data BD have a one-to-one correspondence. The initial value of each data BD is deemed '0' (not shown in the drawing) and the data BD corresponding to a track whose data has been changed changes to '1', as shown at the right side of FIG. 7. One target write section is assigned to one update bitmap. In other words, the history of a copy process corresponding to a copy information belonging to the assigned target write section is recorded in one update bitmap. This will be described in more detail below.

The bitmap management information 320 is information indicating the attributes of the above update bitmaps 341-343. The bitmap management information 320 includes a bitmap number, a target write section, BM marker information and a status entry. The bitmap number is an identifier from 1 to 3 that identifies one of the three update bitmaps 341-343, respectively. The target write section indicates the write section number of the target write section for a given update bitmap. The BM marker information is information regarding the BM marker corresponding to the target write section for the given update bitmap. Where the bitmap marker BM for the target write section for the update bitmap is not received by the secondary storage subsystem 100b or 100c, 'not received' is recorded as the BM marker information. On the other hand, where the bitmap marker BM for the target write section for the update bitmap is received by the secondary storage subsystem 100b or 100c, the write number included in the BM marker is recorded as the BM marker information. The status is information indicating whether or not the update bitmap has been fixed. These various types of information will be described in detail below.

The copy information management table 330 is a table that manages the status of receipt of copy information by the secondary storage subsystems 100*b*, 100*c*. The copy information is managed using write numbers, and the write number for received copy information is recorded in the copy information management table 330. The write number of the copy information is also recorded for each secondary volume of the remote copy pair.

The control program 350 includes various modules to execute the functions of the controllers 110*b*, 110*c* of the secondary storage subsystems 100*b*, 100*c*, but only the modules needed for the description of this embodiment are shown in FIG. 4. The control program 350 includes a secondary-volume remote copy module 351, a bitmap creation module 352 and a pair formation module 353. The secondary-volume remote copy module 351 executes a copy process to write write data to the secondary volume using copy information sent from a storage subsystem 100 including the primary volume (such as the primary storage subsystem 100*a*, for example). The bitmap creation module 352 executes the creation of the above update bitmap, i.e., the creation of history information for the copy process. The pair formation module 353 forms a new remote copy pair when a failure has occurred in a primary volume using the two secondary volumes for that primary volume. For example, if a failure occurs in the logical volume Va in FIG. 1, The pair formation module 353 forms a new remote copy pair in which the logical volume Vb is the new primary volume and the logical volume Vc is the new secondary volume. The pair formation module 353 includes as submodules a difference information creation module 354 and a pair synchronization module 356. The difference information creation module 354 creates difference information indicating the differences between the data recorded in one logical volume and the other logical volume forming of the remote copy pair to be newly created. The difference information creation module 354 includes a possibility determination module 355 that determines whether or not difference information can be created. The pair synchronization module 356 uses this difference information to harmonize the recorded data in the two volumes forming the remote copy pair to be newly created.

A-2. Remote Copying-Related Processes

Figure 10:
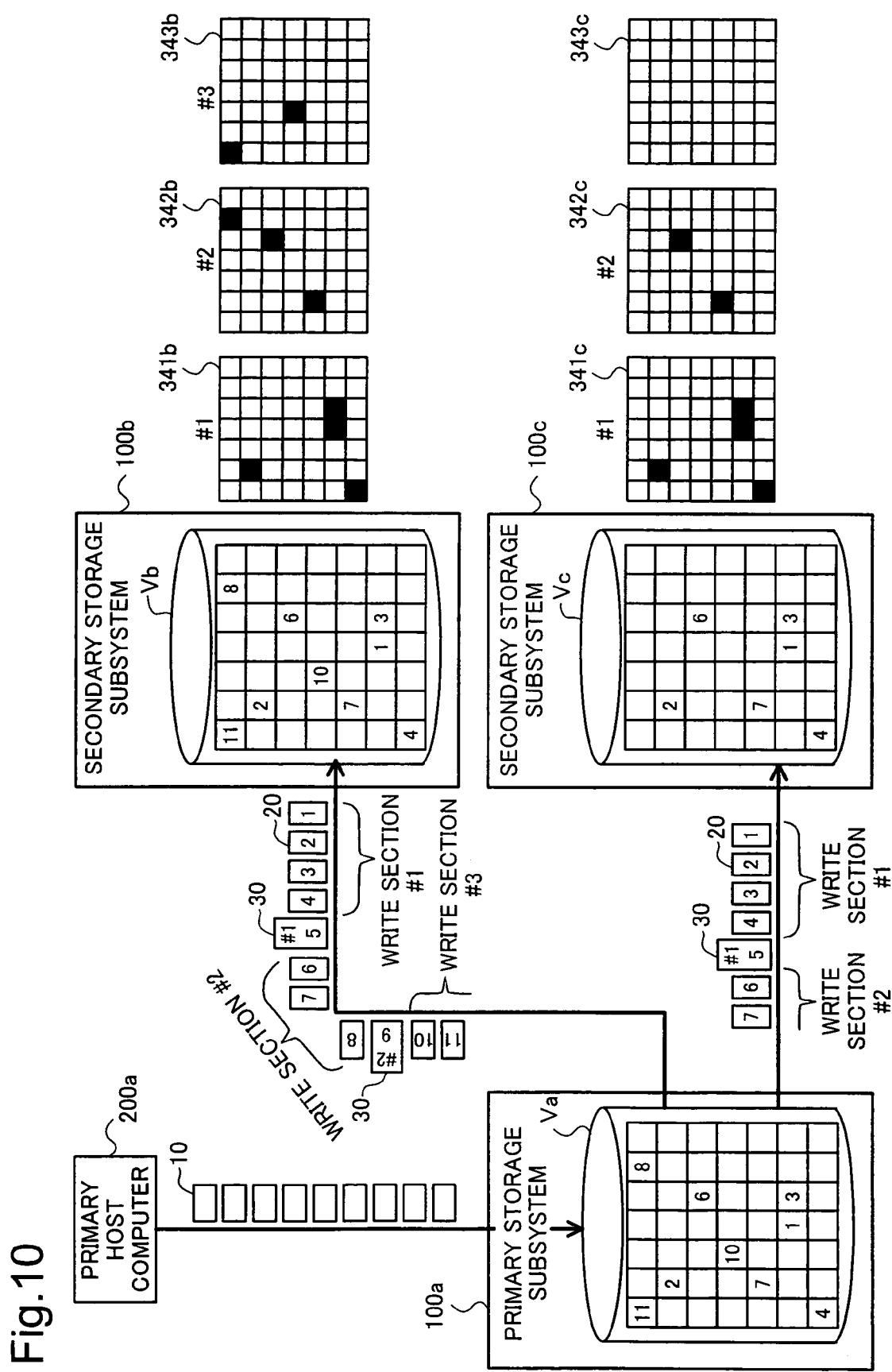
FIG. 10 is an illustration summarizing the remote copying-related processes of the embodiment.
Figure 11:
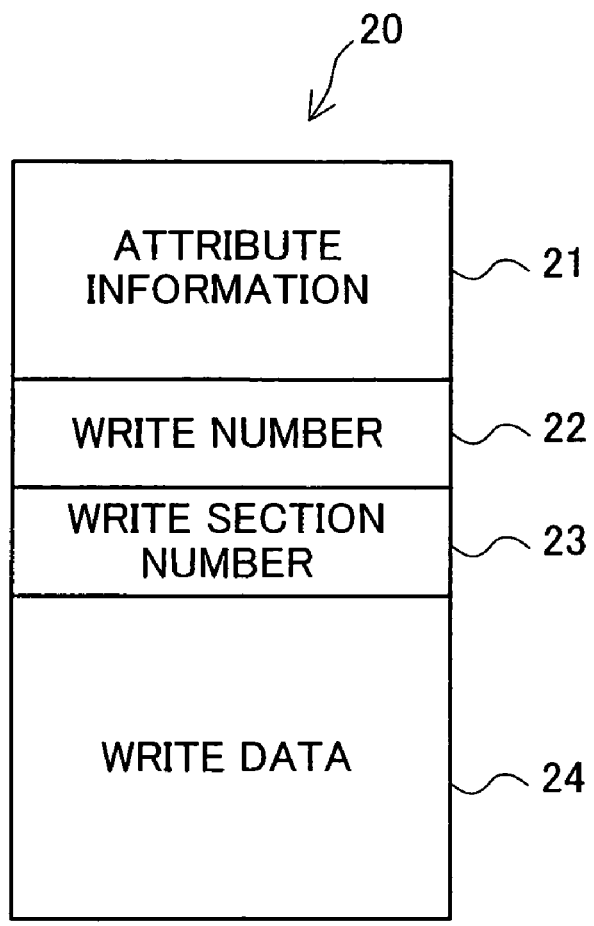
FIG. 11 is a schematic diagram showing an example of copy information.
Figure 12:
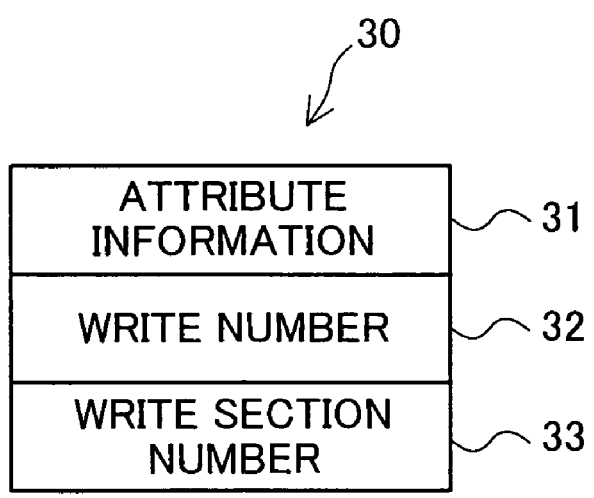
FIG. 12 is a schematic diagram showing an example of a BM marker.
Figure 13:
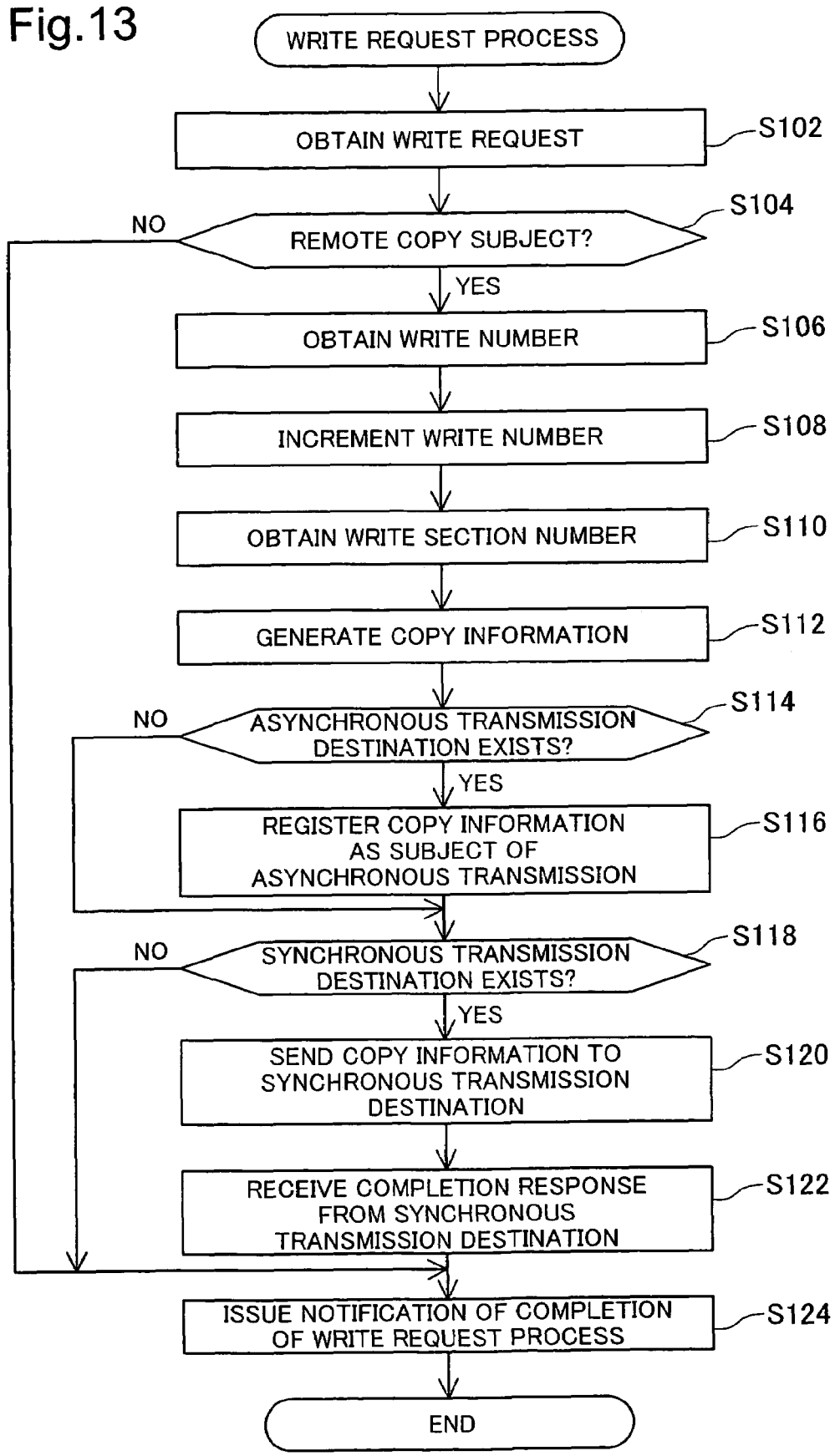
FIG. 13 is a flowchart showing the processing routine of a write request process.
Figure 14:
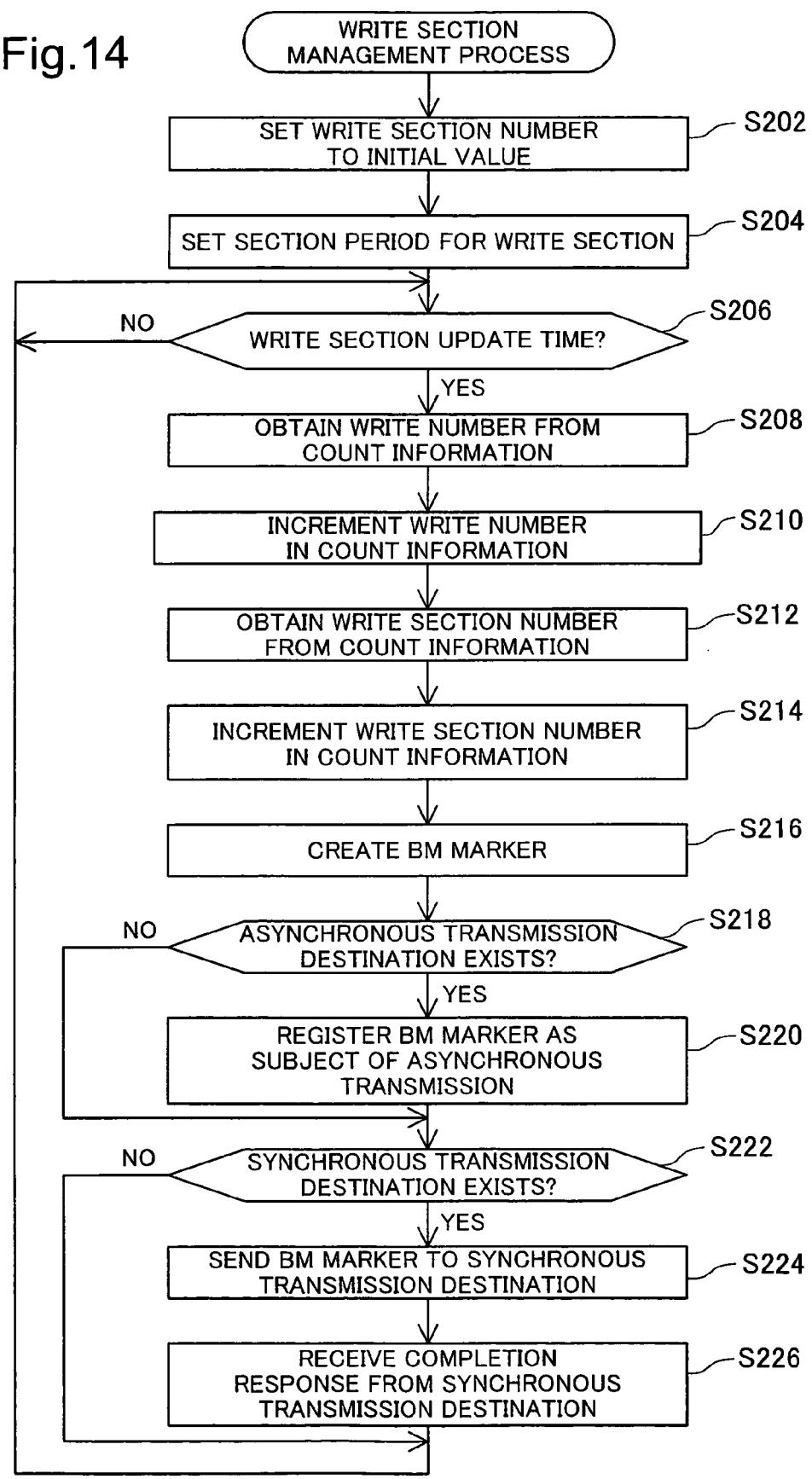
FIG. 14 is a flowchart showing the processing routine of a write section management process.
Figure 15:
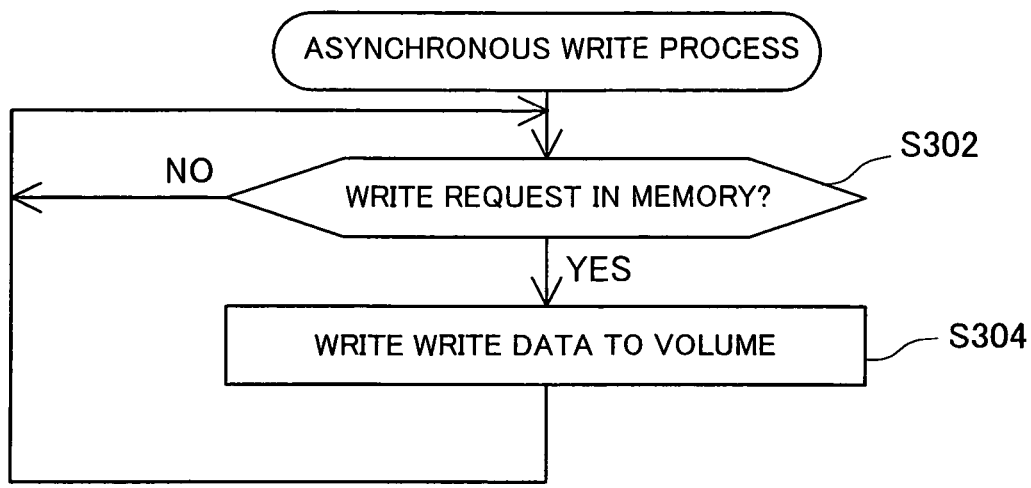
FIG. 15 is a flowchart showing the processing routine of an asynchronous write process.
Figure 16:
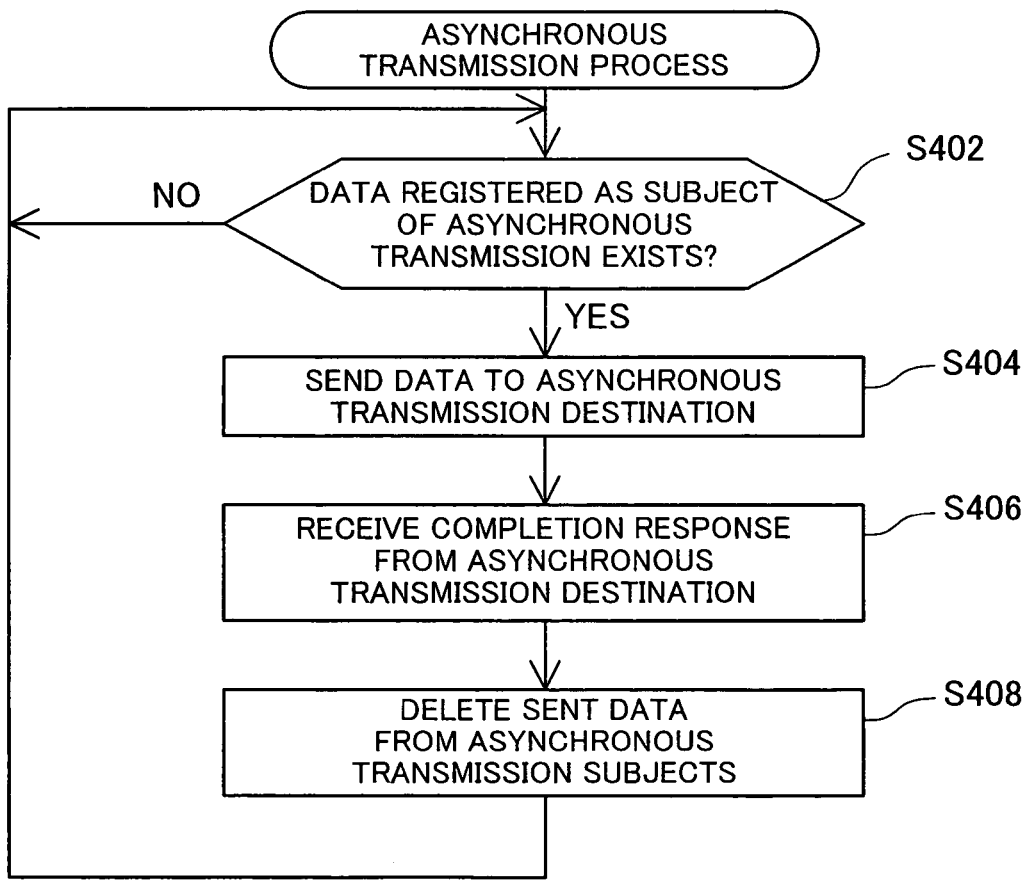
FIG. 16 is a flowchart showing the processing routine of an asynchronous transmission process.
Figure 17:
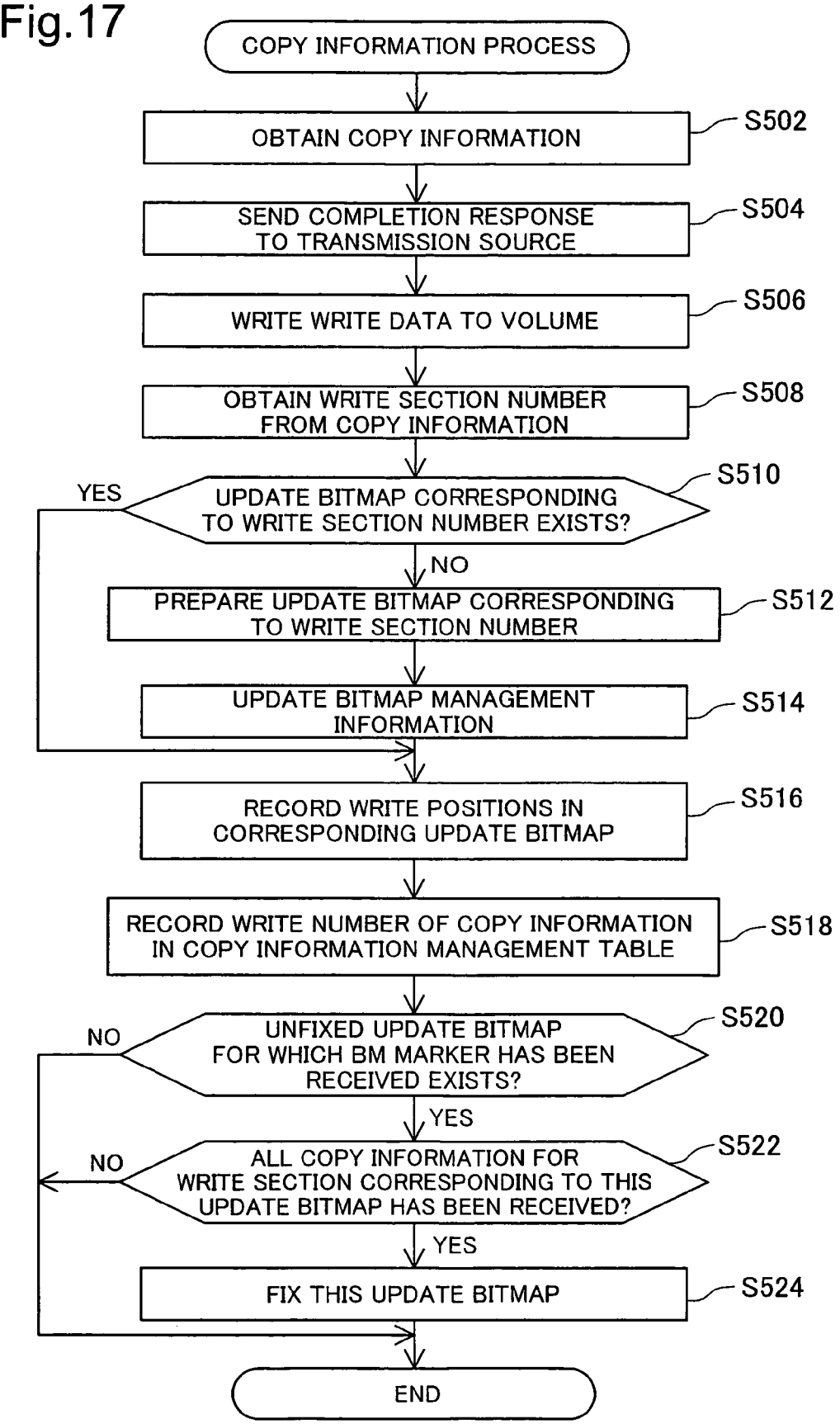
FIG. 17 is a flowchart showing the processing routine of a copy information process.
Figure 18:
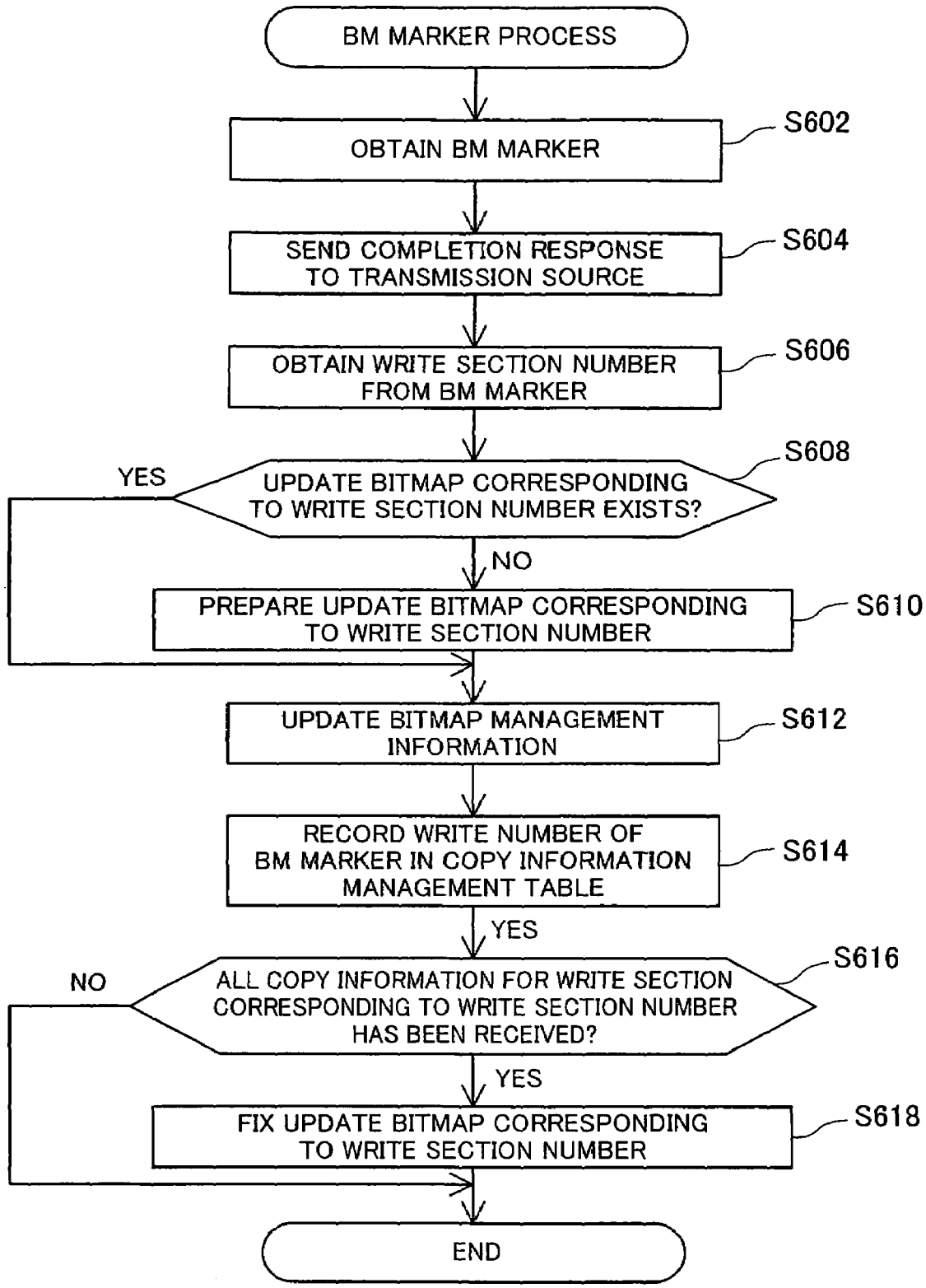
FIG. 18 is a flowchart showing the processing routine of a BM marker process.

Processes related to remote copying in this embodiment will now be described with reference to FIGS. 10-18. These remote copying-related processes include the write request process, asynchronous write process, asynchronous transmit process and write section management process executed in the primary storage subsystem 100*a*, as well as the copy information process and BM marker process executed in the secondary storage subsystems 100*b*, 100*c*. FIG. 10 is an illustration summarizing the remote copying-related processes of this embodiment. FIG. 11 is a schematic diagram showing an example of copy information. FIG. 12 is a schematic diagram showing an example of a BM marker. FIG. 13 is a flowchart showing the processing routine of the write request process. FIG. 14 is a flowchart showing the processing routine of the write section management process. FIG. 15 is a flowchart showing the processing routine of the asynchronous write process. FIG. 16 is a flowchart showing the processing routine of the asynchronous transmit process. FIG. 17 is a flowchart showing the processing routine of the copy information process. FIG. 18 is a flowchart showing the processing routine of the BM marker process.

Where data is to be written to the logical volume Va provided by the primary storage subsystem 100*a*, the primary host computer 200*a* transmits a write request 10 to the primary storage subsystem 100*a*. The write request 10 includes the write data as well as attribute information necessary in order for the primary storage subsystem 100*a* to execute the write request. This attribute information includes information indicating an address specifying the write position for the write data and the size of the write data, for example. These remote copying-related processes are commenced by the receipt of a write request 10 from the primary host computer 200*a*, as shown in FIG. 10. First, the write request process by which a received write request 10 is processed will be explained.

The write request process is a process executed by the controller 110*a* of the primary storage subsystem 100*a* using the primary-volume remote copy module 242 of the control program 350 described above. The write request process is commenced when the primary storage subsystem 100*a* receives a write request 10. When the write request process is begun, the controller 110*a* obtains the write request 10 (step S102). The controller 110*a* determines whether or not the write request 10 is to be the subject of remote copying (step S104). Specifically, the controller 110*a* specifies the logical volume to which the write data is to be written from the attribute information included in the write request 10. The controller 110 refers to the above-described pair information 210 (see FIG. 5A) and checks whether or not the logical volume to which writing is to be performed is the primary volume of a remote copy pair. If the logical volume to which writing is to be performed is the primary volume of a remote copy pair, the controller 110*a* determines that the write request 10 is to be the subject of remote copying (YES in step S104). On the other hand, if the logical volume to which writing is to be performed is not the primary volume of a remote copy pair, the controller 110*a* determines that the write request 10 is not to be the subject of remote copying (NO in step S104). Where the write request 10 involves the logical volume Va, because the logical volume Va is the primary volume of the first and second remote copy pairs described above, the write request 10 is determined to be the subject of remote copying as shown in FIG. 10.

If it is determined that the write request 10 is not to be the subject of remote copying (NO in step S104), the controller 110 notifies the primary host computer 200*a* that write request processing has been completed (step S124). On the other hand, if it is determined that the write request is to be the subject of remote copying (YES in step S104), the controller 110*a* obtains the count value for the write number recorded in the count information 220 described above (step S106). The count value of write number obtained in this manner is a value pertaining to the primary volume designated by the write request as the destination for writing. Next, the controller 110*a* increments upward the count value for the write number recorded in the count information 220 with respect to the primary volume designated by the write request as the destination for writing (step S108). Furthermore, the controller 110*a* obtains the count value for the write section number recorded in the count information 220 (step S110). The write section corresponding to the write section number obtained in this step is deemed the write section applicable to the write process for the currently-underway write request and to which the copy information corresponding to such write process belongs. As described below, because the write section number is updated over time, in this process, the write section applicable to the write process corresponding to the write request and to the copy information corresponding to this write process is determined based on the time at which the write section number is obtained.

When the count value for the write section number is obtained, the controller 110*a* generates copy information 20 (step S122). As shown in FIG. 11, the copy information 20 generated here includes the attribute information 21 and the write data 24 included in the write request 10 obtained in step S102, as well as the write number 22 and write section number 23 obtained in steps S106 and 110, respectively.

When the copy information 20 is generated, the controller 110*a* determines whether or not an asynchronous transmission destination exists (step S114). Specifically, the controller 110*a* refers to the pair information 210 described above (see FIG. 5A) and obtains the copy type information for the remote copy pair in which the logical volume to which writing is requested in the write request 10 is the primary volume. Where 'asynchronous copy' is present in the obtained copy type information, the controller 110*a* then determines that an asynchronous transmission destination exists (YES in step S114). On the other hand, if 'asynchronous copy' is not present in the obtained copy type information, the controller 110*a* determines that an asynchronous transmission destination does not exist (NO in step S114).

If it is determined that an asynchronous transmission destination does not exist (NO in step S114), the controller 110*a* advances to step S118. On the other hand, if it is determined that an asynchronous transmission destination does exist (YES in step S114), the controller 110*a* registers the generated copy information 20 as the subject of asynchronous transmission (step S116). Specifically, an area to store data that is the subject of asynchronous transmission is reserved in the cache area 240 of the memory 114*a*, and the copy information 20 is registered as being the subject of asynchronous transmission by being written to this area.

The controller 110*a* then determines whether or not a synchronous transmission destination exists (step S118). Specifically, if 'synchronous copy' is present in the copy type information obtained in step S114, the controller 110*a* determines that a synchronous transmission destination exists (YES in step S118). If 'synchronous copy' does not exist in the obtained copy type information, however, the controller 110*a* determines that a synchronous transmission destination does not exist (NO in step S118).

If it is determined that a synchronous transmission destination does not exist (NO in step S118), the controller 110*a* notifies the primary host computer 200*a* that the write request process has been completed (step S124), whereupon the process ends. On the other hand, if it is determined that a synchronous transmission destination does exist, (YES in step S118), the controller 110*a* transmits the generated copy information 20 to the synchronous transmission destination, i.e., to the storage subsystem 100 including the secondary volume for the current remote copying session (step S120). When a completion response indicating that the copy information 20 has been received is then received from the synchronous transmission destination (step S122), the controller 110*a* then notifies the primary host computer 200*a* that the write request process has been completed (step S124), whereupon the process ends.

The case where a write request 10 to the logical volume Va (see FIG. 1) is processed via this write request process will now be considered. The first remote copy pair in which the logical volume Va is the primary volume has a copy type of 'synchronous copy' (see FIG. 6A). Therefore, in step S120, the copy information 20 is transmitted to the secondary storage subsystem 100*b* having the logical volume Vb that is the secondary volume of the first copy pair. Furthermore, the second remote copy pair in which the logical volume Va is the primary volume has a copy type of 'asynchronous copy' (see FIG. 5A). Therefore, in step S116, the copy information 20 is registered as the subject of asynchronous transmission.

The write section management process executed in parallel with the above write request process will now be described. The write section management process is a process executed by the controller 110*a* of the primary storage subsystem 100*a* using the write section management module 233 of the control program 230 described above. The write section management process is always executed when the primary storage subsystem 100*a* has received a write request. When the write section management process is begun, the controller 110*a* sets the write section number to an initial value (step S202). The initial value of the write section number is '#0', for example. Here, in this Specification, in order to distinguish the write section number clearly from other numbers such as the write number, the symbol '#' is placed before the number portion. The write section number set to the initial value is recorded in the count information 220 described above.

Next, the controller 110*a* sets the temporal length T (hereinafter the 'section period T') of the write section (step S204). The section period T is a prescribed value set in advance, such as one minute, for example. The controller 110*a* then determines whether or not it is currently the update time for the write section (step S206). The write section is updated every section period T described above. In this step, it is determined whether or not the section period T has elapsed since the most recent write section update. If it is determined that it is not time for write section updating (NO in step S206), the controller 110*a* stands by until the write section update time arrives. If it is determined that the current time is the write section update time (YES in step S206), the count value of write number is obtained from the count information 220 (step S208). This count value of write number is obtained for each primary volume of the remote copy pair set in the primary storage subsystem 100*a*. The controller 110*a* then increments upward the count value of write number recorded in the count information 220 (step S210).

The controller 110*a* next obtains the count value of write section number recorded in the count information 220 (step S212). The controller 110*a* next increments upward the count value of write section number recorded in the count information 220 (step S214). The controller 110*a* then generates a BM marker 30 (step S216). As shown in FIG. 12, the BM marker 30 generated here includes attribute information indicating that it is a BM marker, as well as the write number 32 and write section number 33 that were obtained in steps S208 and S212, respectively.

When the BM marker is generated, the controller 110*a* determines whether or not an asynchronous transmission destination exists (step S218). Specifically, the controller 110*a* refers to the pair information 210 described above (see FIG. 5A) and determines whether or not the remote copy pairs that have a primary volume in the primary storage subsystem 100*a* include a remote copy pair for which the copy type is 'asynchronous copy'. If a remote copy pair for which the copy type is 'asynchronous copy' is included, the controller 110*a* determines that an asynchronous transmission destination exists (YES in step S218). If it is determined that a remote copy pair for which the copy type is 'asynchronous copy' is not included, on the other hand, the controller 110a determines that an asynchronous transmission destination does not exist (NO in step S218).

If it is determined that an asynchronous transmission destination does not exist (NO in step S218), the controller 110a advances to step S222. If it is determined that an asynchronous transmission destination does exist, on the other hand (YES in step S218), the controller 110a registers the generated BM marker as the subject of asynchronous transmission (step S220).

The controller 110a then determines whether or not a synchronous transmission destination exists (step S222). Specifically, the controller 110a refers to the pair information 210 described above (see FIG. 5A) and determines whether or not the remote copy pairs that have a primary volume in the primary storage subsystem 100a include a remote copy pair for which the copy type is 'synchronous copy'. If a remote copy pair for which the copy type is 'synchronous copy' is included, the controller 110a determines that a synchronous transmission destination exists (YES in step S222). If it is determined that a remote copy pair for which the copy type is 'synchronous copy' is not included, on the other hand, the controller 110a determines that a synchronous transmission destination does not exist (NO in step S222).

If it is determined that a synchronous transmission destination does not exist (NO in step S222), the controller 110a returns to step S216 and stands by until the next write section update time. On the other hand, if it is determined that a synchronous transmission destination does exist, (YES in step S222), the controller 110a transmits the generated BM marker 30 to the synchronous transmission destination, i.e., to the storage subsystem 100 to which the remote copy secondary volume belongs (step S224). In this step, the BM marker is transmitted to all storage subsystems 100 that is the synchronous transmission destination. When a completion response indicating that the BM marker 30 has been received is received from the synchronous transmission destination (step S226), the controller 110a returns to step S206 and stands by until the next write section update time.

Through this process, the BM marker is transmitted at a point in time between the transmission of copy information for one write section and the initial transmission of the copy information for the next write section. As can be determined from the above description, the BM marker 30 of this embodiment is equivalent to the boundary information described in the Claims.

The asynchronous write process carried out in parallel with the above write request process will now be described. The asynchronous write process is a process executed by the controller 110a of the primary storage subsystem 100a using the read/write module 231 of the control program 230 described above.

The asynchronous write process is always executed when the primary storage subsystem 100a has received a write request. During execution of the asynchronous write process, the controller 110a continuously monitors whether a write request 10 for which writing has not been performed exists in the memory 114a (step S302). If an write request 10 for which writing has not been performed is determined to exist (YES in step S302), the controller 110a executes the write process to write the write data to the logical volume according to the write request 10 (step S304). Here, if multiple write requests 10 for which writing has not been performed reside in the memory 114a, they are stored therein in such a fashion that the order in which they were received may be determined. The controller 110a then writes the write data to the logical volume according to the order in which the write requests were received.

Next, the asynchronous transmission process executed in parallel with the above write request process will be described. The asynchronous transmission process is a process executed by the controller 110a of the primary storage subsystem 100a using the primary-volume remote copy module 232 of the control program 230 described above.

The asynchronous transmission process is always executed when the primary storage subsystem 100a has received a write request. During execution of the asynchronous transmission process, the controller 110a continuously monitors whether data registered for asynchronous transmission exists (step S402). Data registered for asynchronous transmission may include copy information 20 registered in the write request process (step S116 in FIG. 13) or a BM marker 30 registered in the write section management process (step S216 in FIG. 14). If it is determined that data registered for asynchronous transmission exists (YES in step S402), the controller 110a transmits the data to its asynchronous transmission destination (step S404). Where the data is copy information 20, the asynchronous transmission destination is specified by referring to the attribute information 21 and pair information 210 included in the copy information 20. If the data is a BM marker 30, on the other hand, the asynchronous transmission destination is specified by referring to the pair information 210. Here, the asynchronous transmission destination is not limited to one destination, and multiple destinations are possible. Furthermore, where multiple items of data are registered for asynchronous transmission, the data to be asynchronously transmitted is transmitted in the order of such registration. When a completion response indicating that the transmitted data has been received is then received from the asynchronous transmission destination (step S406), the controller 110a deletes the transmitted data from the data to be asynchronously transmitted (step S408). The controller 110a thereafter returns to step S402.

The copy information process will now be described. The copy information process is a process executed by the controller 110b (110c) of the secondary storage subsystem 100b (100c) using the secondary-volume remote copy module 351 and the bitmap creation module 352 of the control program 350 described above. The copy information process is begun when copy information 20 is received by the secondary storage subsystem 100b (100c). Because the process is identical for either secondary storage subsystem, the copy information process will be described with reference to the controller 100b of the secondary storage subsystem 100b. When the copy information process is begun, the controller 110b obtains the copy information 20 (step S502). The controller 110b then transmits a completion response to the copy information 20 transmission source (in this embodiment, the primary storage subsystem 100a) indicating that the copy information 20 was received (step S504). The controller 110b then executes the copy process to write the write data to the secondary volume based on the obtained copy information 20 (step S506).

The controller 110b then obtains the write section number included in the copy information 20 (step S508). The controller 100b determines whether or not an update bitmap regarding which the write section corresponding to the obtained write section number is the target for recording exists (step S510). Specifically, the controller 110b checks the target write section numbers for the update bitmaps 341-343 with reference to the update bitmap management information 320 described above. If an update bitmap regarding which the write section corresponding to the obtained write section number is the target for recording exists (YES in step S510), the controller 110*b* advances to step S516. If an update bitmap regarding which the write section corresponding to the obtained write section number is the target for recording does not exist (NO in step S510), the controller 110*b* prepares a new update bitmap regarding which the write section corresponding to the obtained write section number is the target for recording (step S412). For example, if an unused update bitmap exists, the controller 110*b* sets the unused update bitmap to the update bitmap for a target write section for the obtained write section number. If an unused update bitmap does not exist, the controller 110*b* clears the update bitmap having the oldest write section, i.e., the write section having the lowest write section number, as the target write section. The controller 110*b* then sets the target write section for the cleared update bitmap to the write section for the obtained write section number. The controller 110*b* updates the bitmap management information 320 in response to this change in the attributes of the update bitmaps (step S514).

The controller 110*b* then records the write position of the write data written in step S566 in the update bitmap regarding which the write section corresponding to the obtained write section number is the target for recording (step S516). Specifically, in this update bitmap, the controller 110*b* sets the value of one-bit data BD corresponding to the track TR in which the write data was written to '1'. The controller 110*b* then records the value for the write number 22 of the copy information 20 being processed in the copy information management table 330 for each secondary volume (step S518).

Next, the controller 110*b* advances to the processes to fix the update bitmaps (steps S520-S524). First, the controller 110*b* determines whether or not there exists among the update bitmaps 341-343 an update bitmap that is not fixed and regarding which a BM marker 30 has been received (step S520). Specifically, with reference to the bitmap management information 320, the controller 110*b* checks whether an update bitmap for which BM marker information has been received and whose status is recorded as unfixed exists therein. If it is determined that a unfixed update bitmap for which a BM marker 30 has been received does not exist (NO in step S520), this process ends. If it is determined that a unfixed update bitmap for which a BM marker 30 has been received does exist (YES in step S520), the controller 110*b* determines whether or not all copy information 20 belonging to the target write section for this update bitmap has been received (step S522). Specifically, the controller 110*b* obtains the write number (see FIG. 8) recorded as the BM marker information for this update bitmap in the bitmap management information 320. The controller 110*b* then determines, with reference to the copy information management table 330, whether or not all copy information having a write number lower than the write number recorded as the BM marker information have been received.

If it is determined that not all copy information belonging to the target write section for this update bitmap have been received (NO in step S522), the controller 110*b* ends this process. If it is determined that all copy information belonging to the target write section for this update bitmap have been received, on the other hand (YES in step S522), the controller 110*b* fixes the update bitmap (step S524) and ends the process. Fixing of the update bitmap is carried out by changing the status of the update bitmap in the bitmap management information 320 from 'unfixed' to 'fixed'.

The BM marker process will now be described. The BM marker process is a process executed by the controller 110*b* (110*c*) of the secondary storage subsystem 100*b* (secondary storage subsystem 100*c*) using the secondary-volume remote copy module 351 and bitmap creation module 352 of the control program 350 described above. The BM marker process is begun when a BM marker 30 is received by the secondary storage subsystem 100*b* (secondary storage subsystem 100*c*). Because the process is identical for either secondary storage subsystem, the BM marker process will be described with reference to the controller 110*b* of the secondary storage subsystem 100*b*. When the BM marker process is begun, the controller 110*b* obtains the BM marker 30 (step S602). The controller 110*b* then sends a completion response to the transmission source of the BM marker 30 (in this embodiment, the primary storage subsystem 100*a*) indicating that the BM marker 30 has been received (step S604).

The controller 110*b* then obtains the write section number included in the BM marker 30 (step S606). The controller 110*b* then, as in step S510 of the copy information process described above, determines whether an update bitmap regarding which the write section corresponding to the obtained write section number is the target for recording exists (step S608). If an update bitmap regarding which the write section corresponding to the obtained write section number is the target for recording exists (YES in step S608), the controller 110*b* advances to step S612. If an update bitmap regarding which the write section corresponding to the obtained write section number is the target for recording does not exist (NO in step S608), the controller 110*b*, as in step 512 of the copy information process described above, prepares a new update bitmap regarding which the write section corresponding to the obtained write section number is the target for recording (step S610).

The controller 110*b* changes the bitmap management information 320 with regard to the update bitmap regarding which the write section corresponding to the obtained write section number is the target for recording (step S612). Specifically, the BM marker information for the update bitmap regarding which the write section corresponding to the obtained write section number is the target for recording is changed from 'not received' to 'the write number included in the BM marker 30'. The controller 110*b* also records the write number included in the BM marker 30 in the copy information management table 330 (step S614).

The controller 110*b* then advances to the processes to fix the update bitmaps (steps 616-618). First, the controller 110*b* determines whether or not all copy information 20 belonging to the write section corresponding to the write section number included in the BM marker 30 has been received (step S616). Specifically, with reference to the copy information management table 330, the controller 110*b* determines whether all copy information having a write number lower than the write number included in the BM marker 30 have been received. If it is determined that not all copy information 20 have been received (NO in step S616), the controller 110*b* ends this process. If it is determined that all copy information 20 have been received, on the other hand (YES in step S616), the controller 110*b* fixes the update bitmap for which the target write section is the write section corresponding to the write section number included in the BM marker 30 (step S618) and ends the process.

The remote copying-related processes described above will now be further described with reference to FIG. 10. In FIG. 10, the logical volumes Va, Vb, Vc and the multiple tracks TR contained in these logical volumes Va, Vb, Vc are shown in a conceptual fashion. In FIG. 10, the sequential transmission of nine write requests 10 from the primary host computer 200a to the primary storage subsystem 100a requesting that data be written to the logical volume Va are shown. The write processes for these write requests 10 are performed on the logical volume Va via the asynchronous write process described above (see FIG. 15). In addition, the copy information 20 for each write request 10 is transmitted via the write request process (see FIG. 13) and the asynchronous transmission process (see FIG. 16), respectively, to the secondary storage subsystems 100b, 100c having the logical volumes Vb, Vc, i.e., the secondary volumes that form remote copy pairs together with the logical volume Va.

FIG. 10 shows in a conceptual fashion the sending of copy information 20 from the primary storage subsystem 100a to the secondary storage subsystem 100b and the secondary storage subsystem 100c. In FIG. 10, the number associated with each packet of copy information 20 is the write number included in that copy information 20 (see FIG. 11). In FIG. 10, the number affixed to a given track TR in the logical volume Va indicates in a conceptual fashion that that track TR is a track TR as to which the write process corresponding to a write request 10 has been performed. Here, for ease of explanation, as the number affixed to the track TR of the logical volume Va, write number included in the copy information 20 corresponding to the write process is used.

FIG. 10 furthermore shows in a conceptual fashion the sending of transmitted BM markers 30 from the primary storage subsystem 100a to the secondary storage subsystem 100c, as in the case of the copy information 20. Copy information 20 having a write number between the write number of the first BM marker 30 and the write number of a subsequent BM marker 30 belong to the write section for the write section number included in the subsequent BM marker 30. For example, in FIG. 10, the copy information 20 below the write number 5, i.e., the copy information 20 for the write numbers 1-4, belong to the write section #1. The copy information 20 having the write numbers 6-8, i.e., the write numbers from the write number 6 up to the write number 9 of the next BM marker 30, belong to the write section #2. Here, the write section #n indicates the write section having a write section number of #n.

Here, as shown in FIG. 10, if a copy information 20 sent to the secondary storage subsystem 100b via synchronous transmission and a copy information 20 sent to the secondary storage subsystem 100c via asynchronous transmission corresponds to the sama write process to the primary volume, the two packets of copy information 20 belong to the same write section, because, as can be seen from the write request process described above, the write section to which the corresponding copy information belongs is set for each write process executed to the logical volume Va that is the primary volume.

Furthermore, the copy process is executed on the secondary storage subsystem 100b and secondary storage subsystem 100c via the copy information process (see FIG. 17) described above using the copy information 20. The update bitmaps 341b-343b are created on the secondary storage subsystem 100b, and the update bitmaps 341c-343c are created on the secondary storage subsystem 100c, via the copy information process (see FIG. 17) and BM marker process (see FIG. 18) described above. FIG. 10 shows the logical volume Vb at the moment that the copy process has been executed on the secondary storage subsystem 100b using the copy information 20 having the write numbers 1-11, as well as the update bitmaps 341b-343b at that moment. It also shows the logical volume Vc at the moment that the copy process has been executed on the secondary storage subsystem 100c using the copy information having the write numbers 1-7, together with the update bitmaps 341a-341c at that moment.

In FIG. 10, a write number is affixed to some of the tracks TR of the logical volumes Vb and Vc. The tracks TR to which a write number is affixed are the tracks TR to which write data has been written via the copy process using a copy information 20 having that write number. In the secondary storage subsystem 100b, the write section #1 is the target write section for the update bitmap 341b. Recorded and fixed in the update bitmap 341b is the entire history of the copy processes for the copy information 20 belonging to the write section #1. Similarly, the entire history of the copy processes for the copy information 20 to be recorded is recorded and fixed in the update bitmap 342b for which the write section #2 is the target write section. The update bitmap 343b for which the write section #3 is deemed the target write section is not yet fixed. When processing proceeds from this point in time and copy information 20 or a BM marker 30 associated with the write section #4 is received, the update bitmap 341b is cleared and the target write section for the update bitmap 341b is set to the write section #4.

On the other hand, in the secondary storage subsystem 100c, the moment at which the copy process has been performed using the copy information 20 having the write numbers 1-7 is shown. Therefore, the update bitmap 341c for which the write section #1 is the target write section is fixed. However, because the copy information 20 with the write number 8 belonging to the write section #2 has not yet been received, the update bitmap 342c for which the write section #2 is the target write section is not fixed.

Remote copying is carried out in the storage system 1000 shown in FIG. 1 by executing the remote copying-related processes described above.

A-3. Process Executed Upon Failure in Primary Volume

The process executed when a failure occurs in the primary volume will now be described with reference to FIGS. 19-21. Where there are at least two remote copy pairs that share the same primary volume, the process executed upon the occurrence of failure is a pair formation process that forms a new remote copy pair using the secondary volumes of the two remote copy pairs. Through this pair formation process, a system construction in which data redundancy is ensured can be re-established.

Figure 19:
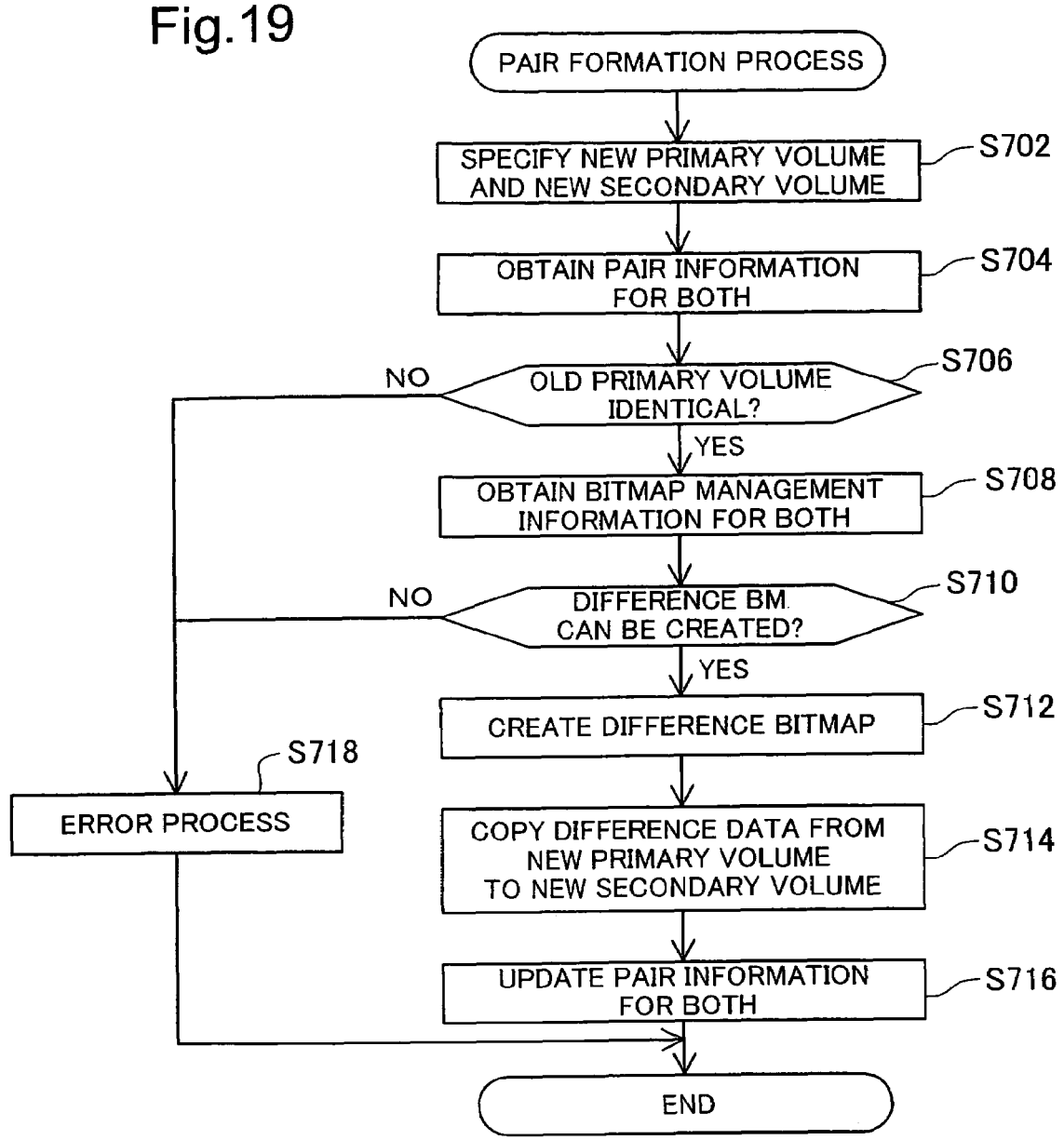
FIG. 19 is a flowchart showing the processing routine of a pair formation process.

FIG. 19 is a flowchart showing the processing routine of the pair formation process. FIG. 20 is a table to explain the possibility of creating difference information. FIG. 21 is an illustration summarizing the pair formation process.

The pair formation process on the storage system 1000 shown in FIG. 1 will be described below using the example of a failure occurring on the logical volume Va that is the primary volume for the first and second remote copy pairs. At the outset, in order to execute the pair formation process, the secondary storage subsystem 100b and the secondary storage subsystem 100c must be communicably interconnected via a communication line CV. The pair formation process is executed on the storage subsystem 100 having a secondary volume belonging to a remote copy pair. In the example shown in FIG. 1, it is executed on either the secondary storage subsystem 100b or the secondary storage subsystem 100c. Because the same process is executed in either case, the description will assume that the process is executed on the secondary storage subsystem 110b.

The pair formation process is a process that is executed on the secondary storage subsystem 100b by the controller 110b using the pair formation module 353 of the control program 350 described above. The pair formation process is begun when the user instructs the commencement thereof via the secondary host computer 200b or a management computer not shown. When the pair formation process is begun, the controller 110b specifies the new primary volume and new secondary volume that will form the remote copy pair to be formed (step S702). Here, in order to clarify the distinction, the remote copy pairs, primary volume and secondary volumes that existed at the time of the failure are prefaced with the word 'old', while the remote copy pair, primary volume and secondary volume that are to be newly formed in this process are prefaced with the word 'new'. The new primary volume and the new secondary volume are specified based on a user instruction. In the discussion below, it is assumed that the logical volume Vb of the secondary storage subsystem 100b is specified as the new primary volume, while the logical volume Vc of the secondary storage subsystem 100c is specified as the new secondary volume.

Next, the controller 110b obtains the pair information for both the new primary volume and the new secondary volume (step S704). Specifically, the controller 110b obtains the pair information 310b stored in the memory 114b. In addition, the controller 110b obtains the pair information 310c stored in the memory 114c of the secondary storage subsystem 100c from the secondary storage subsystem 100c via the communication line CV.

The controller 110b then determines, with reference to the obtained copy pair information 310b and 310c, whether or not the specified new primary volume and new secondary volume previously formed old remote copy pairs with the same volume as the old primary volume (step S706). In the example of FIG. 1, it can be seen that the logical volume Vb specified as the new primary volume and the logical volume Vc specified as the new secondary volume both formed an old remote copy pair with the logical volume Va as the old primary volume. If it is determined that the old primary volumes are not identical (NO in step S706), the controller 110b executes error processing (step S718) and ends the process. Error processing includes a process in which, for example, the user is notified that the process has ended abnormally. On the other hand, f it is determined that the old primary volumes are the same volume, (YES in step S706), the controller 110b obtains the bitmap management information for the new primary volume and new secondary volume (step S708). Specifically, the controller 110b obtains the bitmap management information 320b stored in the memory 114b. In addition, the controller 110b obtains the bitmap management information 320c stored in the memory 114c of the secondary storage subsystem 100c from the secondary storage subsystem 100c.

When the two bitmap management information sets 320b, 320c are obtained, the controller 110b determines whether or not a difference bitmap that includes difference information indicating the differences between the data stored in the new primary volume and the data stored in the new secondary volume can be created (step S710). This determination regarding the possibility of creating a difference bitmap is made based on the status of fixing of the update bitmaps 341b-343b for the logical volume Vb as the new primary volume and of the update bitmaps 341c-343c for the logical volume Vc as the new secondary volume. These two fixing statuses are recorded in the obtained bitmap management information sets 320a, 320c as described above (see FIG. 8).

In the example shown in FIG. 21, regarding the logical volume Vb, the fixed update bitmaps regarding which the write sections #4 and #5 are the target write sections are stored in the secondary storage subsystem 100b. At the same time, for the logical volume Vc, the fixed update bitmaps regarding which the write sections #3 and #4 are the target write sections are stored in the secondary storage subsystem 100c. Therefore, with respect to the logical volume Vc whose copy process progress is less advanced, it can be seen that at least the copy process corresponding to the copy information 20 belonging to the write section #4 has been executed. As a result, it can be seen that the difference between the data stored in the logical volume Vb and the data stored in the logical volume Vc is based on the copy process with regard to the copy information 20 belonging to the write sections including and subsequent to the write section #5. Therefore, if the oldest update bitmap (i.e., the update bitmap having the smallest target write section number) for the logical volume Vb whose copy process progress is more advanced is at or prior to the write section #5, a difference bitmap can be created. In the example shown in FIG. 21, because a update bitmap for the write section #5 exists for the logical volume Vb, a difference bitmap can be created.

The determination regarding the possibility of creating a difference bitmap will be described in more detail below with reference to FIG. 20. In the third row of the table shown in FIG. 20, the volume whose copy process progress is less advanced, i.e., the logical volume Vc, has fixed update bitmaps for the write sections #1 and #2. In other words, for both of the logical volumes Vb and Vc, the copy process has been completed at least for the copy information 20 belonging to the write section #2. Therefore, if an update bitmap regarding which the write sections including and subsequent to the write section #3 are the target write sections exists for both the logical volume Vb and the logical volume Vc, a difference bitmap can be created. However, with respect to the volume whose copy progress is more advanced, i.e., the logical volume Vb, while such volume has fixed update bitmaps for the write sections #4 and #5, and does not have a fixed update bitmap for the write section #3. Therefore, in this case, it is determined that a difference bitmap cannot be created. Generally speaking, the target write section for the update bitmap that was fixed last (i.e., the most recent of the fixed update bitmaps) and is associated with the logical volume Vb or Vc whose copy process progress is less advanced is deemed the write section #n. In this case, if the logical volume Vb or Vc whose copy process progress is more advanced has a bitmap regarding which the write section #(n+1) is the target write section, it is determined that a difference bitmap can be created. For example, in the case of the row numbers 1 and 2 in the table of FIG. 20, a difference bitmap can be created.

If it is determined that a difference bitmap cannot be created (NO in step S710), the controller 110b executes error processing (step S718) and ends the process. On the other hand, f it is determined that a difference bitmap can be created (YES in step S710), the controller 110b creates a difference bitmap (step S712). In the example shown in FIG. 21, the controller 110b creates a difference bitmap 500 by synthesizing the bitmaps 342b, 343b, 343c for write sections including and subsequent to the write section #5. Generally speaking, as between the update bitmaps for the logical volumes Vb and Vc, the update bitmap 500 is created by synthesizing all of the update bitmaps for which the write sections including and subsequent to the write section #(n+1) are the target write sections. In the difference bitmap 500, the tracks TR that were to be updated in any of the update bitmaps used during the synthesis process (i.e., tracks TR for which the value of the one-bit data BD is '1') are deemed to be updated. In the difference bitmap 500, only the tracks TR that were not to be updated in any of the update bitmaps used for synthesis (i.e., the tracks TR for which the value of the one-bit data BD is '0') are deemed not to be updated. Where a difference bitmap cannot be created, in this embodiment, difference bitmap creation is canceled and the process is ended, but a different embodiment may be adopted wherein processing is performed to copy all data from the new primary volume to the new secondary volume.

Next, the controller 110b copies from the new primary volume to the new secondary volume only the difference data sought with reference to the created difference bitmap 500 (step S714). Specifically, as shown in FIG. 21, only the tracks TR deemed to be updated in the created difference bitmap 500 are copied from the logical volume Vb to the logical volume Vc. As a result, the contents of the logical volume Vc are harmonized with the contents of the logical volume Vb. The creation of a difference bitmap via the synthesis of unfixed update bitmaps in addition to fixed update bitmaps on these two volumes (the new primary volume and the new secondary volume) is performed in order to harmonize the data on the new primary volume and the data on the new secondary volume by copying the tracks that are updated on one volume (the new primary volume or the new secondary volume) but are not updated on the other volume (the new secondary volume or the new primary volume) from the new primary volume to the new secondary volume.

The controller 110b then updates the pair information sets 310b, 310c located on the secondary storage subsystem 100b having the logical volume Vb (the new primary volume) and the secondary storage subsystem 100c having the logical volume Vc (the new secondary volume), respectively (step S716). In other words, the old remote copy pair information is deleted from the pair information sets 310b, 310c and the new remote copy pair information is recorded therein. Updating of the pair information 310c stored on a different secondary storage subsystem 100c is carried out via the controller 110b instructing the secondary storage subsystem 100c to update the pair information 310c. When the pair information sets 310b, 310c are updated, this process is ended.

According to the embodiment described above, a write section is set for each write process and the histories of the remote copying on each secondary volume (the logical volumes Vb, Vc) are recorded as update bitmaps 341-343 for each write section. As a result, the contents of the logical volumes Vb, Vc can be updated simply be creating a difference bitmap and copying the difference data. Consequently, where a failure occurs in the logical volume Va, for example, a new remote copy pair can be immediately formed using the logical volume Vb and the logical volume Vc.

In addition, the degree of remote copying progress can be easily understood with reference to the bitmap management information 320. As a result, the possibility of forming a difference bitmap, i.e., the possibility of forming a new remote copy pair simply by copying difference data, can be easily determined.

Furthermore, the secondary storage subsystems 100b, 100c that possess the secondary volumes can be easily notified of the write section to which corresponding to a copy information 20 belongs through the transmission of the BM marker 30 and the inclusion of the write section number in the copy information 20.

Moreover, because serial common write numbers are affixed to copy information 20 and BM markers 30, the correct order can be established by the secondary storage subsystems 100b, 100c even if the transmission order of the copy information 20 and BM markers 30 is switched due to a mix-up in communication lines, for example.

In addition, each of the secondary storage subsystems 100b, 100c that possess the secondary volumes need only record only the update bitmaps 341-343 for its own secondary volume, and need not record the update bitmaps for the other secondary volume. Consequently, the method of this embodiment can be applied to the various system constructions described below without increasing the burden on a specific secondary storage subsystem 100.

B. Variations

B-1. First Variation

Figure 22:
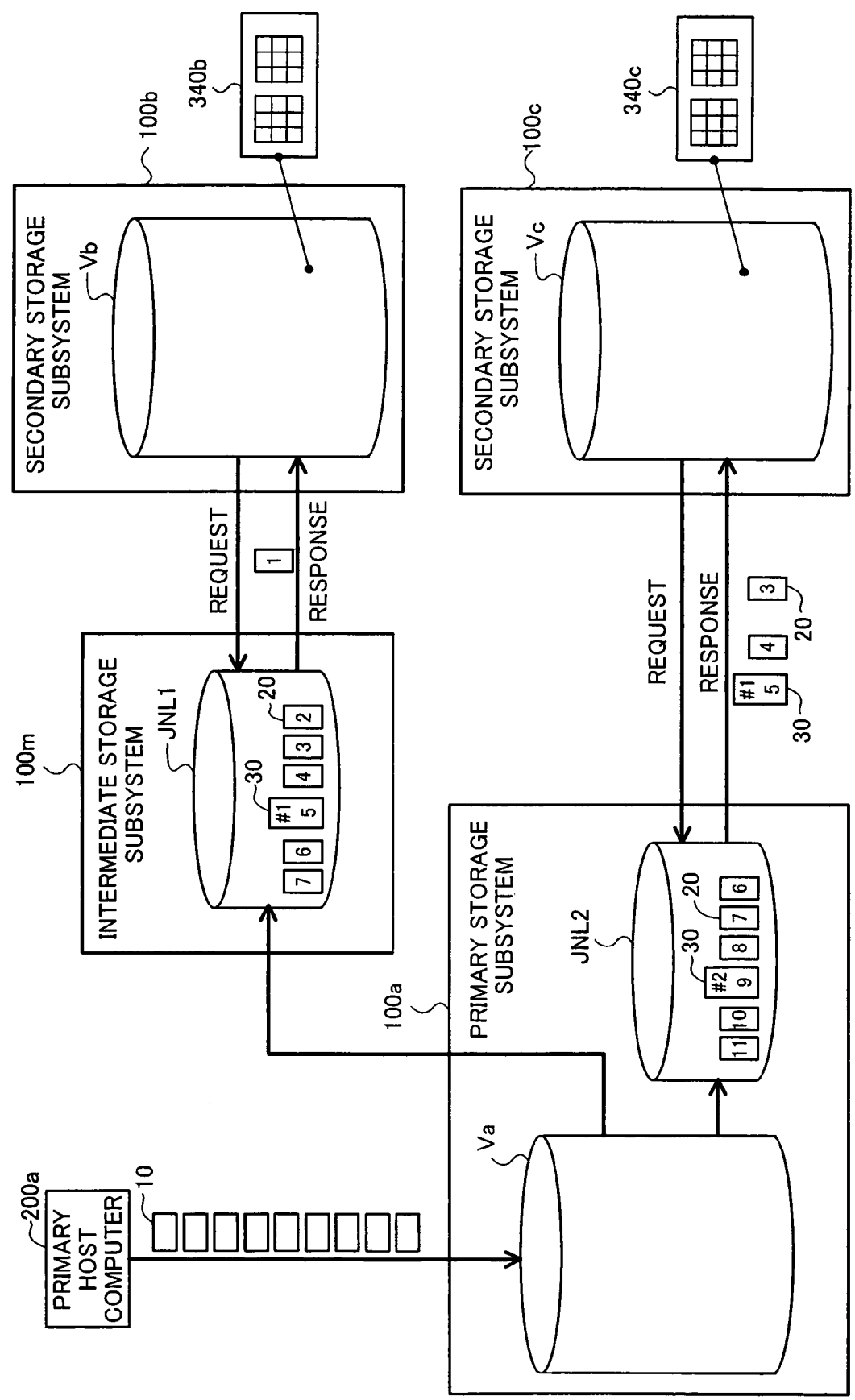
FIG. 22 is an illustration showing the arrangement of a storage system pertaining to a first variation.

For example, the method of this embodiment may be applied regardless of the type of remote copying performed. In this embodiment, the first remote copy pair formed from the logical volume Va and the logical volume Vb were formed via synchronous remote copying, and the second remote copy pair formed from the logical volume Va and the logical volume Vc were formed via asynchronous remote copying, but both pairs may be formed via synchronous remote copying, or both pairs may be formed via asynchronous remote copying. In the method of this embodiment, it is not required that the copy process be more advanced for one remote copy pair than for the other. Therefore, it makes no difference which remote copy pair's copy process is progressing more quickly, and the degree of remote copying progress may be switched during the remote copying process. For example, the method of this embodiment may be applied to the storage system shown in FIG. 22. FIG. 22 is an illustration showing the arrangement of a storage system pertaining to a first variation.

The storage system 1000 pertaining to this first variation, like the storage system pertaining to the embodiment shown in FIG. 1, has a first remote copy pair formed by a logical volume Va and a logical volume Vb, as well as a second remote copy pair formed by the logical volume Va and a logical volume Vc. Unlike in the storage system pertaining to the first embodiment shown in FIG. 1, however, in the storage system 1000 pertaining to this first variation, both the first and second remote copy pairs are asynchronous copy pairs, and the asynchronous copying scheme is different as well. In the asynchronous remote copying of the embodiment, when the copy information 20 was registered as the subject of asynchronous transmission, the copy information 20 was stored in the cache area 240 of the primary storage subsystem 100a, but in the storage system 1000 pertaining to this first variation, the copy information 20 is stored in a volume called a 'journal volume'. A journal volume is not an area in the memory 114, but is rather a logical volume associated with a disk device of the storage unit 120. A journal volume JNL1 for a first remote copy pair in FIG. 22 is a logical volume of an intermediate storage subsystem 100m. At the same time, a journal volume JNL2 for a second remote copy pair in FIG. 22 is a logical volume in the primary storage subsystem 100a. In this way, a journal volume may be prepared on the same storage subsystem as the primary volume or on a different storage subsystem from the primary volume. Furthermore, in the asynchronous transmission process of the embodiment (see FIG. 16), the controller 110a unilaterally transmitted the copy information 20 to the asynchronous transmission destination (for example, the secondary storage subsystem 100b), but the copy information 20 may instead be sent to the asynchronous transmission destination in response to a request therefrom. In the example of FIG. 22, the secondary storage subsystems 100b, 100c possessing the secondary volumes send a copy information 20 transmission request to the storage subsystems 110m, 100a possessing the journal volumes JNL1, JNL2. The storage subsystems 110m, 100a possessing the journal volumes JNL1, JNL2 then send to the secondary storage subsystems 100b, 100c the copy information 20 stored on the journal volumes JNL1, JNL2 in response to this transmission request.

As shown in FIG. 22, the method of the embodiment may be applied in any of the remote copying systems described above by including update bitmap groups 340b, 340c for each secondary volume.

B-2. Second Variation

Furthermore, in the method of the embodiment, the storage subsystem 100 possessing the primary volume need only send to the storage subsystem 100 possessing the secondary volumes the information notifying it of the write sections (i.e., the BM markers 30 and/or the write section numbers included in the copy information 20) in addition to the entire copy information 20, and the storage subsystem 100 possessing the secondary volume need only include a group of update bitmaps for that secondary volume. Therefore, the method of the embodiment is not limited to the system shown in FIG. 1 in which there are two secondary volumes for one primary volume, but may be easily applied in a system including three or more secondary volumes for one primary volume.

Figure 23:
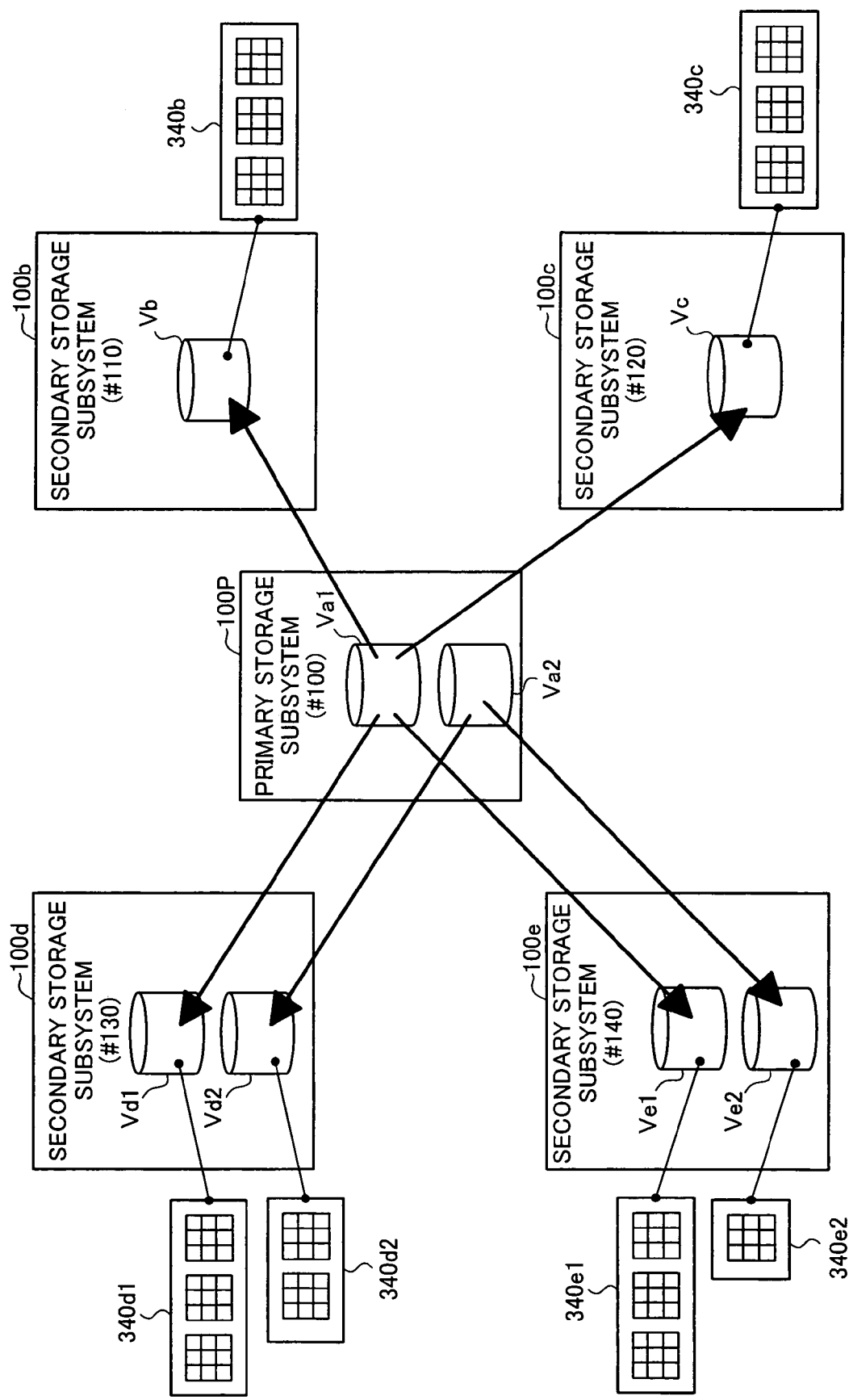
FIG. 23 is an illustration showing the arrangement of a storage system pertaining to a second variation.

For example, the method of the embodiment may be applied in the storage system shown in FIG. 23. FIG. 23 is an illustration showing the arrangement of a storage system of a second variation. In the example shown in FIG. 23, the primary storage subsystem 100a has two logical volumes Va1, Va2, each being the primary volume of a remote copy pair. The logical volume Va1 forms remote copy pairs with the logical volumes Vb, Vc, Vd1, Ve1 possessed by four different secondary storage subsystems 100b-100e, respectively. The logical volume Vb forms remote copy pairs with the logical volumes Vd2, Ve2 possessed by two different secondary storage subsystems 100d, 100e, respectively. Where the method of the embodiment is applied in the system shown in FIG. 23, the update bitmap groups 340b, 340c, 340d1, 340d2, 340e1, 340e2 are respectively recorded for the secondary volumes Vb, Vc, Vd1, Vd2, Ve1, Ve2. In the system shown in FIG. 23, if a failure occurs in the primary storage subsystem 100a, for example, a new remote copy pair can be quickly formed by any two logical volumes among the four secondary volumes Vb, Vc, Vd1, Ve1 forming the old remote copy pair with logical volume Va1. This is because a difference bitmap between any two logical volumes can be created using the update bitmaps recorded for any two logical volumes. Furthermore, there is no need to determine in advance which secondary volumes will be used to form a new remote copy pair in the event of a failure in the primary storage subsystem 100a. Therefore, the user can flexibly form a new remote copy pair after the failure has occurred taking into account the nature and status of the failure and other conditions.

B-3. Other Variations

In the above embodiment, the section period T governing the write sections was preset, but the section period T need not be set solely in this fashion. For example, the section period T may be set 'on the fly', i.e., dynamically. Alternatively, the section period T may be set based on an instruction from the primary host computer 200a or a management computer. Where write requests are sent frequently, if the section period T is too long, a large amount of changes will be recorded in one write section, As a result, if a failure occurs, a large amount of difference data will need to be copied between the new primary volume and the new secondary volume. At the same time, where the difference in the degree of progress in remote copying between different secondary volumes is large, if the section period T is to short, the likelihood increases that a difference map cannot be created in the event of a failure. The section period T should be set taking into consideration such factors as the frequency of write request transmission and the difference in the progress of remote copying between the various secondary volumes.

The number of update bitmaps for each secondary volume is not limited to the three that were used in the embodiment. Any appropriate number may be used, taking into account the capacity of the memory 114 that stores the update bitmaps and the difference in the degree of remote copying progress that can occur between the secondary volumes. Furthermore, only one update bitmap is also acceptable. This is because it can be seen that even if there is only one update bitmap, for example, write sections including and prior to the write section currently undergoing recording are fixed. When a difference bitmap is to be created, only unfixed difference bitmap is used regarding the old secondary volume whose copy progress is less advanced. Therefore, there can be situations in which only one update bitmap is sufficient with regard to a secondary volume that is certain to lag behind other secondary volumes in its remote copying progress.

The mechanism by which the copying history can be recorded for each write section is not limited to the use of update bitmaps of the embodiment. For example, the top address and the data size of the updated data can be recorded in a log for each write section. However, because an update bitmap is a collection of one-bit data BD, it offers the advantage of enabling the recording of history information with a relatively small amount of data. Naturally, in the update bitmap, the sub-storage areas in which the existence of a change to data is recorded are not limited to the tracks TR used in the embodiment. Where the logical volumes are managed using an LBA (logical block address), wherein the logical volume is a collection of logical blocks, update bitmap recording may be performed by units comprising one or more logical blocks.

While the present invention has been described on the basis of the embodiment and variations, these embodiment and variations of the invention described herein are merely intended to facilitate understanding of the invention, and implies no limitation thereof. Various modifications and improvements of the invention are possible without departing from the spirit and scope thereof as recited in the appended claims, and these will naturally be included as equivalents in the invention.

What is claimed is:

1. A storage system that includes a first storage subsystem having a first storage area and multiple second storage subsystems that each include a second storage area for storing duplicate data for data stored in the first storage area;
    wherein the first storage subsystem comprises:
        a writing module that executes a write process by which write data is written to the first storage area;
        a copy information transmission module that, in conjunction with the write process, sends copy information to the second storage subsystems, wherein the copy information is used to copy the write data to the second storage areas;

a section establishment module that establishes a write section for each write process, wherein the write section is a temporal section to which the copy information corresponding to the write process belongs; and a section information transmission module that transmits section information to the second storage subsystems, wherein the section information indicates the write section to which the copy information belongs; and wherein the second storage subsystems each comprise:

a copy execution module that executes a copy process corresponding to the write process using the copy information; and a history creation module that creates history information using the section information for each write section that the copy information used in the copy process belongs to, wherein the history information includes history of each executed copy process, wherein the history information created for each write section includes a map that records whether data has been changed due to the copy process for each of multiple sub-storage areas, wherein the second storage area is divided into the multiple sub-storage areas.

2. The storage system according to claim 1, wherein the section information includes a boundary information that indicates a boundary between first and second write sections that are continuous write sections, wherein the copy information transmission module transmits the corresponding copy information in the order in which the write processes are executed, and wherein the section information transmission module transmits the boundary information at a specific timing between the transmission of the last copy information belonging to the first write section and the transmission of the first copy information belonging to the second write section.

3. The storage system according to claim 2, wherein common serial numbers are assigned to the copy information and the boundary information in the order of their transmission.

4. The storage system according to claim 1, wherein the section information includes a section identifier that identifies the write section, and wherein the section information transmission module transmits the section identifier together with each copy information, wherein the section identifier is for the write section to which the copy information belongs.

5. The storage system according to claim 1, wherein the history information for each the write section is fixed for the write section that is object of history creation when history of copy processes corresponding to all copy information belonging to the write section has been recorded.

6. The storage system according to claim 5, wherein the second storage subsystems each maintain the history information that has not yet been fixed, as well as history information that has been most recently fixed, wherein the fixed history information is for a prescribed number of write sections.

7. The storage system according to claim 1, wherein the history information for each the write section includes position information used to specify a position in the second storage area, wherein at the second storage area, data was changed due to the copy process.

8. The storage system according to claim 7, wherein the position information includes a map that stores existence or nonexistence of a data change due to the copy process for each of multiple sub-storage areas, wherein the second storage area is divided into the multiple sub-storage areas.

9. The storage system according to claim 1, wherein temporal length of the write section is set taking into consideration degree of progress of the copy process in each of the second storage subsystems and the number of the write sections, wherein the history information for the write sections is maintained in each of the second storage subsystems.

10. A storage system that includes a first storage subsystem having a first storage area and multiple second storage subsystems that each include a second storage area for storing duplicate data for data stored in the first storage area;

wherein the first storage subsystem comprises:

a writing module that executes a write process by which write data is written to the first storage area;

a copy information transmission module that, in conjunction with the write process, sends copy information to the second storage subsystems, wherein the copy information is used to copy the write data to the second storage areas;

a section establishment module that establishes a write section for each write process, wherein the write section is a temporal section to which the copy information corresponding to the write process belongs; and a section information transmission module that transmits section information to the second storage subsystems, wherein the section information indicates the write section to which the copy information belongs;

wherein the second storage subsystems each comprise:

a copy execution module that executes a copy process corresponding to the write process using the copy information; and a history creation module that creates history information using the section information for each write section that the copy information used in the copy process belongs to, wherein the history information includes history of each executed copy process; and wherein at least one of the multiple second storage subsystems comprises:

a difference information creation module that creates difference information that indicates differences between first data and second data, using at least part of the history information possessed by one of the second storage subsystems and the history information possessed by another of the second storage subsystem, wherein the first data stores in the second storage area belonging to the one of the second storage subsystem, wherein the second data stores in the second storage area belonging to the another of the second storage subsystem, and a synchronization module that harmonizes the first data and the second data, using the difference information.

11. The storage system according to claim 10, wherein the history information for each the write section is fixed for the write section that is object of history creation when history of copy processes corresponding to all copy information belonging to the write section has been recorded, wherein the difference information creation module comprises a determination module that obtains fixed/unfixed status of the history information created for each of the write sections from the one of the second storage subsystem and the another of the second storage subsystem, and determines based on the fixed/unfixed status whether the difference information is creatable, and wherein the difference information creation module creates the difference information when the determination module has determined that the difference information is creatable.

12. The storage system according to claim 11, wherein the second storage subsystems each maintain the history information that has not yet been fixed, as well as history information that has been most recently fixed, wherein the fixed history information is for a prescribed number of write sections, wherein the write section corresponding to the history information that has most recently been fixed in a slower storage subsystem is a first write section, wherein the slower storage subsystem is the storage subsystem that has made slower progress in the copy process between the one of the second storage subsystem and the another of the second storage subsystem, and wherein the determination module determines the difference information is creatable if a faster storage subsystem maintains the history information for a second write section, wherein the second write section is the write section immediately following the first write section, wherein the faster storage subsystem is the storage subsystem that has made faster progress in the copy process between the one of the second storage subsystem and the another of the second storage subsystem.

13. The storage system according to claim 12, wherein the difference information creation module creates the difference information using the history information for write sections including and after the second write section among the history information possessed by the one of the second storage subsystem and the another of the second storage subsystem.

14. The storage system according to claim 10, wherein the difference information creation module and the synchronization module operate where a failure has occurred in the first storage area.

15. A control method for a storage system that includes a first storage subsystem having a first storage area and multiple second storage subsystems that each include a second storage area for storing duplicate data for data stored in the first storage area, the control method comprising:

executing a write process by which write data is written to the first storage area;

executing a copy process to copy the write data to the second storage area of each second storage subsystem in conjunction with the write process;

establishing a write section for each write process, wherein the write section is a temporal section to which copy information corresponding to the write process belong; and creating a history of each executed copy process in each the second storage subsystem for each write section that the copy information used in the copy process belongs to, wherein the history information created for each write section includes a map that records whether data has been changed due to the copy process for each of multiple sub-storage areas, wherein the second storage area is divided into the multiple sub-storage areas.

16. The control method according to claim 15, further comprising:

creating difference information that shows differences between first data and second data using at least part of the history information possessed by one of the second storage subsystems and the history information possessed by another of the second storage subsystem, wherein the first data stores in the second storage area belonging to the one of the second storage subsystem, wherein the second data stores in the second storage area belonging to the another of the second storage subsystem; and harmonizing the first data and the second data, using the difference information.

17. The control method according to claim 16, wherein the history information created for each the write section is fixed for the write section where the copy process history corresponding to all copy information belonging to the write section has been created, wherein the creating difference information includes:

obtaining fixed/unfixed status of the history information created for each the write section from the one of the second storage subsystem and the another of the second storage subsystem, respectively;

determining whether the difference information is creatable based on the fixed/unfixed status; and creating the difference information when determining that the difference information is creatable.

18. The control method according to claim 16, wherein the creating difference information and the harmonizing the first data and the second data are executed when a failure occurs in the first storage area.

* * * * *